(12) United States Patent
Kawamoto

(10) Patent No.: US 7,199,890 B2
(45) Date of Patent: Apr. 3, 2007

(54) PRINT CONTROL METHOD AND APPARATUS

(75) Inventor: Hirokazu Kawamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 10/727,640

(22) Filed: Dec. 5, 2003

(65) Prior Publication Data

US 2004/0080779 A1    Apr. 29, 2004

Related U.S. Application Data

(63) Continuation of application No. 09/268,701, filed on Mar. 16, 1999, now abandoned.

(30) Foreign Application Priority Data

Mar. 17, 1998  (JP)  ................................. 10-066539
Mar. 8, 1999   (JP)  ................................. 11-060090

(51) Int. Cl.
  *G06F 3/12*   (2006.01)
  *G06F 13/10*  (2006.01)
  *G06F 11/30*  (2006.01)
  *G06F 15/00*  (2006.01)

(52) U.S. Cl. .................... 358/1.14; 358/1.15; 719/321; 710/15

(58) Field of Classification Search .................. None
See application file for complete search history.

(56) References Cited

U.S. PATENT DOCUMENTS

| 5,566,278 | A  | * | 10/1996 | Patel et al. ................. 358/1.15 |
| 5,625,757 | A  |   | 4/1997  | Kageyama et al. ......... 358/1.14 |
| 5,678,000 | A  | * | 10/1997 | Ohtani ......................... 358/1.2 |
| 5,859,956 | A  | * | 1/1999  | Sugiyama et al. .......... 358/1.13 |
| 5,881,213 | A  | * | 3/1999  | Shaw et al. ................. 358/1.15 |
| 5,995,722 | A  | * | 11/1999 | Kishida ....................... 358/1.15 |
| 6,070,000 | A  | * | 5/2000  | Mori ........................... 358/1.15 |
| 6,213,652 | B1 | * | 4/2001  | Suzuki et al. ............... 358/1.15 |
| 6,275,299 | B1 | * | 8/2001  | Beck ........................... 358/1.15 |
| 6,552,813 | B2 | * | 4/2003  | Yacoub ........................ 358/1.1 |

* cited by examiner

*Primary Examiner*—Twyler Lamb
*Assistant Examiner*—Benjamin Dulaney
(74) *Attorney, Agent, or Firm*—Fitzpatrick, Cella, Harper & Scinto

(57) ABSTRACT

A print processing environment in which an alternate printing process can be automatically performed by a printing apparatus of a next priority when a fault occurs during a printing process is freely established. A common driver for converting data that does not depend on a printing apparatus into print data to an arbitrary printing apparatus is provided, thereby releasing an application early. When an error occurs during the printing process for the selected printing apparatus, the printing apparatus of the next priority is automatically selected. A printer driver peculiar to the selected printing apparatus forms print control information that is optimum to the printing apparatus of the next priority in a short time from a drawing object as apparatus independent data which has already been converted by a common printer driver and stored in a spool file.

28 Claims, 14 Drawing Sheets

ERROR

ALL PRINTER DRIVERS INSTALLED FAILED.
PLEASE CHECK PRINTER DRIVER(S) OR PRINTER(S).

OK

| PRINTER AS SELECTED | PRINTER OF NEXT PRIORITY | | |
|---|---|---|---|
| PRINTER 604 | 606 → 608 | | |
| | COMPATIBILITY | ○ | × |
| PRINTER 606 | 604 → 608 | | |
| | COMPATIBILITY | ○ | × |
| PRINTER 608 | 606 → 604 | | |
| | COMPATIBILITY | × | × |

FIG. 12

MEMORY MAP OF MEM
MEDIUM (FD/CD-ROM)

| DIRECTORY |
|---|
| FIRST DATA PROCESSING PROGRAM<br>PROGRAM CODES FOR STEPS OF FLOWCHART SHOWN IN FIG. 9 |
| SECOND DATA PROCESSING PROGRAM<br>PROGRAM CODES FOR STEPS OF FLOWCHART SHOWN IN FIG. 11 |

| PRINTER AS SELECTED | PRINTER OF NEXT PRIORITY |
|---|---|
| PRINTER A | B → C |
| PRINTER B | A → C |
| PRINTER C | B → A |

PRINT CONTROL METHOD AND APPARATUS

This application is a continuation of Application No. 09/268,701, filed Mar. 16, 1999 now abandoned.

BACKGROUND OF THE INVENTION

1. Field of the Invention

The invention relates to a print control apparatus which can transfer peculiar print information to a plurality of printing apparatuses through a predetermined communication medium. The invention also relates to a data processing method of such a print control apparatus and a memory medium in which a computer readable program to realize such a data processing method has been stored.

2. Related Background Art

Hitherto, in case of executing a print from an application on a computer, print data of a format depending on a desired printing apparatus on the computer is formed by a printer driver corresponding to the desired printing apparatus and the print data is transmitted to the printing apparatus.

However, if a print is performed by using the printer driver depending on the printing apparatus at the time of execution of the print from the application as mentioned above, when a some error occurs during the generation of the print data of the printer driver, during the transmission of the print data, or during the print by the printing apparatus and the print is not successively completed, the user needs to allow the same printing apparatus to re-execute the print by the application or to allow another printing apparatus to execute the print.

SUMMARY OF THE INVENTION

The invention is made to solve the above problems and it is an object of the invention to provide a print control apparatus in which when an error occurs during a printing process to a selected printing apparatus, a printing apparatus of a next priority which is desired by the user is automatically selected and print control information that is optimum to the printing apparatus of a next priority is formed in a short time from a drawing object that has already been converted, thereby making it possible to freely establish a print processing environment such that an alternate printing process can be automatically performed by the printing apparatus of a next priority at the time of occurrence of a fault during the printing process. Another object of the invention is to provide a data processing method of such a print control apparatus and a memory medium in which a computer readable program to realize such a data processing method has been stored.

The invention is made in consideration of the foregoing conventional technique and it is still another object of the invention to provide print control apparatus and method which can avoid a fault during the execution of the print and can allow the print to be certainly performed without troubling the user.

Further another object of the invention is to enable a desired print output of the user to be performed by notifying the user of a problem occurring by changing a printing apparatus of the output destination side or by solving the problem by alternate means.

According to a first aspect of the invention, there is provided a print control apparatus which can communicate with a plurality of printing apparatuses via a predetermined communication medium, comprising: first converting means for converting drawing information which is required from an application into a drawing object which does not depend on each printing apparatus; storing means for storing the drawing object converted by the first converting means; a plurality of second converting means for converting the drawing object stored in the storing means into print control information that is peculiar to the printing apparatus that is selected and for transferring the print control information to each corresponding printing apparatus; discriminating means for discriminating the occurrence of a print processing error by monitoring a print processing state for a time interval from the start of the converting process by any one of the second converting means until a printing process of any one of the printing apparatuses is finished; and control means for selecting any one of the second converting means corresponding to the set other printing apparatus when it is determined by the discriminating means that the print processing error has occurred in such one of the printing apparatuses.

According to a second aspect of the invention, in the print control apparatus, the print processing error includes a conversion processing error by any one of the second converting means, a transfer error of the print control information which is converted by any one of the second converting means, and an engine operation error of any selected one of the printing apparatuses.

According to a third aspect of the invention, the print control apparatus further has: setting means for setting, every printing apparatus, the printing apparatus of a next priority to which the drawing object stored in the storing means should be transferred when the print processing error occurs; and memory means for storing a list of the printing apparatuses of a next priority which have been set by the setting means and to which the drawing object should be transferred, wherein the control means selects any one of the second converting means corresponding to another printing apparatus set in the list of the printing apparatuses of the next priority stored in the memory means.

According to a fourth aspect of the invention, the printing apparatus includes a local printer and network printers.

According to a fifth aspect of the invention, in the print control apparatus, the network printers include: a first network printer which is connected to the predetermined communication medium via a server; and a second network printer which is directly connected to the predetermined communication medium.

According to a sixth aspect of the invention, there is provided a data processing method of a print control apparatus which can communicate with a plurality of printing apparatuses via a predetermined communication medium, comprising: a first converting step of converting drawing information which is required from an application into a drawing object which does not depend on each printing apparatus; a storing step of storing the drawing object converted by the first converting step into a memory; a plurality of second converting steps of converting the drawing object stored in the memory by the storing step into print control information that is peculiar to the printing apparatus that is selected and transferring the print control information to each corresponding printing apparatus; a discriminating step of discriminating the occurrence of a print processing error by monitoring a print processing state for a time interval from the start of the converting process by any one of the second converting steps until a printing process of any one of the printing apparatuses is finished; and a selecting step of selecting any one of the second converting steps corresponding to the set other printing apparatus when it is determined by the discriminating step that the print processing error has occurred in such one of the printing apparatuses.

According to a seventh aspect of the invention, in the data processing method, the print processing error includes a conversion processing error by any one of the second converting steps, a transfer error of the print control information which is converted by any one of the second converting steps, and an engine operation error of any selected one of the printing apparatuses.

According to an eighth aspect of the invention, the data processing method further has: a setting step of setting, every printing apparatus, the printing apparatus of a next priority to which the drawing object stored in the memory should be transferred when the print processing error occurs; and a registering step of registering a list of the printing apparatuses of a next priority which have been set by the setting step and to which the drawing object should be transferred into the memory, wherein in the selecting step, any one of the second converting steps corresponding to another printing apparatus set in the list of the printing apparatuses of the next priority stored in the memory is selected.

According to a ninth aspect of the invention, the printing apparatus includes a local printer and network printers.

According to a tenth aspect of the invention, in the data processing method, the network printers include: a first network printer which is connected to the predetermined communication medium via a server; and a second network printer which is directly connected to the predetermined communication medium.

According to an eleventh aspect of the invention, there is provided a memory medium in which a computer readable program for controlling a data processing apparatus which can communicate with a plurality of printing apparatuses via a predetermined communication medium has been stored, wherein the program comprises: a first converting step of converting drawing information which is required from an application into a drawing object which does not depend on each printing apparatus; a storing step of storing the drawing object converted by the first converting step into a memory; a plurality of second converting steps of converting the drawing object stored in the memory by the storing step into print control information that is peculiar to the printing apparatus that is selected and transferring the print control information to each corresponding printing apparatus; a discriminating step of discriminating the occurrence of a print processing error by monitoring a print processing state for a time interval from the start of the converting process by any one of the second converting steps until a printing process of any one of the printing apparatuses is finished; and a selecting step of selecting any one of the second converting steps corresponding to the set other printing apparatus when it is determined by the discriminating step that the print processing error has occurred in such one of the printing apparatuses.

According to a twelfth aspect of the invention, in the computer readable program stored in the memory medium, the print processing error includes a conversion processing error by any one of the second converting steps, a transfer error of the print control information which is converted by any one of the second converting steps, and an engine operation error of any selected one of the printing apparatuses.

According to a thirteenth aspect of the invention, the computer readable program stored in the memory medium has: a setting step of setting, every printing apparatus, the printing apparatus of a next priority to which the drawing object stored in the memory should be transferred when the print processing error occurs; and a registering step of registering a list of the printing apparatuses of a next priority which have been set by the setting step and to which the drawing object should be transferred into the memory, wherein in the selecting step, any one of the second converting steps corresponding to another printing apparatus set in the list of the printing apparatuses of the next priority stored in the memory is selected.

According to a fourteenth aspect of the invention, in the computer readable program stored in the memory medium, the printing apparatus includes a local printer and network printers.

According to a fifteenth aspect of the invention, in the computer readable program stored in the memory medium, the network printers include: a first network printer which is connected to the predetermined communication medium via a server; and a second network printer which is directly connected to the predetermined communication medium.

According to a sixteenth aspect of the invention, the print control apparatus further has second discriminating means for discriminating a compatibility between the printing apparatus of the next priority selected by the selecting means and a printing apparatus of a previous priority, wherein the control means transfers the converted print control information to the printing apparatus of the next priority when it is determined by the second discriminating means that there is the compatibility between the printing apparatus of the next priority and the printing apparatus of a previous priority.

According to a seventeenth aspect of the invention, the data processing method has: a second discriminating step of discriminating a compatibility between the printing apparatus of the next priority selected by the selecting step and a printing apparatus of a previous priority; and a transferring step of transferring the converted print control information to the printing apparatus of the next priority when it is determined by the second discriminating step that there is the compatibility between the printing apparatus of the next priority and the printing apparatus of the previous priority.

According to an eighteenth aspect of the invention, the computer readable program stored in the memory medium further has: a second discriminating step of discriminating a compatibility between the printing apparatus of the next priority selected by the selecting step and a printing apparatus of a previous priority; and a transferring step of transferring the converted print control information to the printing apparatus of the next priority when it is determined by the second discriminating step that there is the compatibility between the printing apparatus of the next priority and the printing apparatus of the previous priority.

According to the invention, the above objects are accomplished by a print control apparatus comprising: print control means for forming data which does not depend on a printing apparatus to execute the print; means for converting the data which was formed by the print control means and does not depend on the printing apparatus into print data to an arbitrary printing apparatus; means for transmitting the print data to the printing apparatus; means for monitoring until the completion of the print of the transmitted print data; means for changing a printing apparatus on the output destination side on the basis of the data which does not depend on the printing apparatus in the case where the print is unsuccessfully completed due to some causes among the above three means, namely, during the conversion into the print data to the arbitrary printer, during the transmission of the print data, or before completion of the print in the printing apparatus, for converting into the print data to the changed printing apparatus, for sending it to the means for executing the print, and when a print instruction of the user before the change of the printing apparatus cannot be executed as it is by the changed printing apparatus on the output destination side, for notifying the user of such a fact; and means for allowing the user to select whether the subsequent print is continued or not and, when the user selects the stop of the print, for allowing the printing apparatus before the change to re-execute the print.

The print control apparatus further has means for, when the print instruction of the user cannot be executed because a shortage of an ability of the printing apparatus after the change, modifying the print data which is sent to the printing apparatus on the basis of the data which does not depend on the printing apparatus and for substituting the print instruction of the user.

BRIEF DESCRIPTION OF THE DRAWINGS

FIG. 12 is a diagram for explaining a memory map of a memory medium to store various data processing programs which can be read out by the print system to which the data processing apparatus according to the invention can be applied;

DETAILED DESCRIPTION OF THE PREFERRED EMBODIMENTS

First Embodiment

Figure 1:
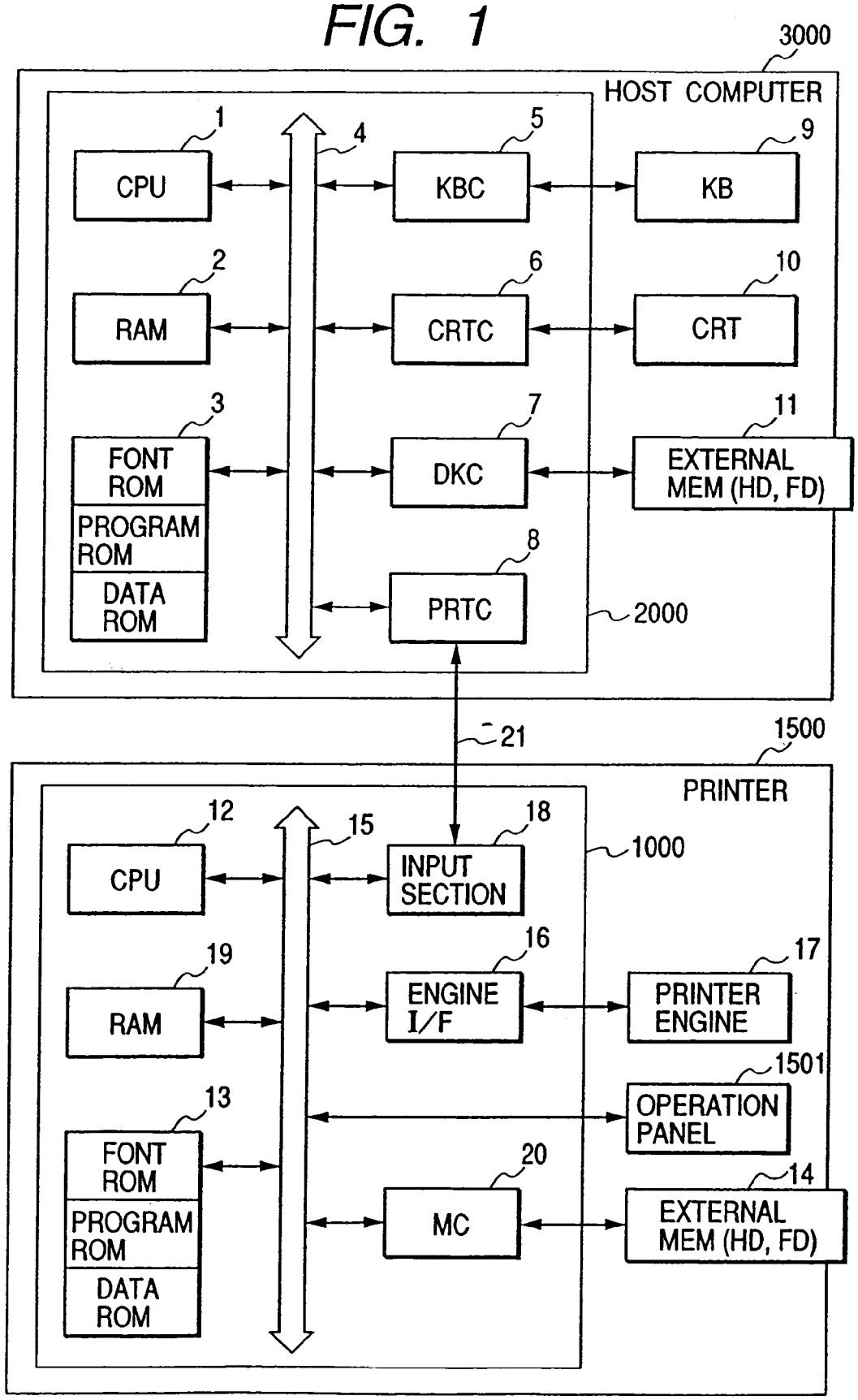
FIG. 1 is a block diagram for explaining a construction of a print system to which a data processing apparatus showing the first embodiment of the invention can be applied.

FIG. 1 is a block diagram for explaining a construction of a print system to which a data processing apparatus showing the first embodiment of the invention can be applied. The invention can be applied to any one of single equipment, a system comprising a plurality of equipment, and a system which is connected through a network such as LAN, WAN, or the like and executes processes so long as the functions of the invention are executed.

In the diagram, a host computer 3000 has a CPU 1 to execute a process of a document in which a figure, an image, characters, a table (including a spreadsheet or the like) and the like mixedly exist on the basis of a document processing program or the like stored in a program ROM in an ROM 3 or an external memory 11. Each device connected to a system bus 4 is integratedly controlled by the CPU 1.

An operating system program (hereinafter, abbreviated as an OS) as a control program of the CPU 1 or the like is stored in the program ROM in the ROM 3 or the external memory 11. Font data and the like which is used when performing the image processes are stored in a font ROM in the ROM 3 or the external memory 11. Various data which is used when performing the image processes or the like is stored in a data ROM in the ROM 3 or the external memory 11. An RAM 2 functions as a main memory, a work area, or the like of the CPU 1.

Reference numeral 5 denotes a keyboard controller (KBC) to control a key input from a keyboard 9 or a pointing device (not shown); 6 a CRT controller (CRTC) to control a display of a CRT display (CRT) 10; and 7 a disk controller (DKC) to control an access to the external memory 11 such as hard disk (HD), floppy disk (FD), or the like to store a boot program, various applications, font data, a user file, an edition file, a printer control command forming program (hereinafter, referred to as a printer driver) including a print control program, and the like.

Reference numeral 8 denotes a printer controller (PRTC) which is connected to a printer 1500 through a bidirectional interface (interface: I/F) 21 and executes a communication control process with the printer 1500.

The CPU 1 executes, for example, a developing (rasterizing) process of outline fonts to a display information RAM set on the RAM 2, thereby enabling WYSIWYG to be executed on the CRT 10. The CPU 1 opens various registered windows on the basis of commands instructed by a mouse cursor or the like (not shown) on the CRT 10 and executes various data processes. When executing the print, the user opens a window regarding the setting of the print and can set a printer and a print processing method for a printer driver including the selection of a print mode.

In the printer 1500, reference numeral 12 denotes a printer CPU (CPU) to output an image signal as output information to a printing section (printer engine) 17 connected to a system bus 15 on the basis of a control program or the like stored in a program ROM in the ROM 13 or a control program or the like stored in an external memory 14. The control program of the CPU 12 and the like are stored in a program ROM in the ROM 13. Font data and the like which are used when the output information is formed are stored in a font ROM in the ROM 13. In case of a printer without the external memory 14 such as a hard disk or the like, information and the like which is used on the host computer have been stored in a data ROM in the ROM 13. Reference numeral 1000 denotes a printer control unit.

The CPU 12 can communicate with the host computer 3000 through an input section 18 and can notify the host computer 3000 of information or the like in the printer. An RAM 19 is an RAM which functions as a main memory, a work area, or the like of the CPU 12 and is constructed so that a memory capacity can be expanded by an option RAM which is connected to an expansion port (not shown). The RAM 19 is used as an output information rasterizing area, an environment data storing area, an NVRAM, or the like. An access to the external memory 14 such as hard disk (HD), IC card, or the like mentioned above is controlled by a memory controller (MC) 20. The external memory 14 is connected as an option and stores font data, an emulation program, form data, and the like. Switches, an LED display, and the like for operation are arranged on an operation panel 1501.

As for the external memory 14, the number of external memories is not limited to one but a plurality of external memories can be provided. That is, it is also possible to construct such that in addition to built-in fonts, option cards and a plurality of external memories in which programs to interpret printer control languages of different language systems have been stored can be connected. Further, the apparatus can also have an NVRAM (not shown) and store printer mode set information from the operation panel 1501.

Figure 2:
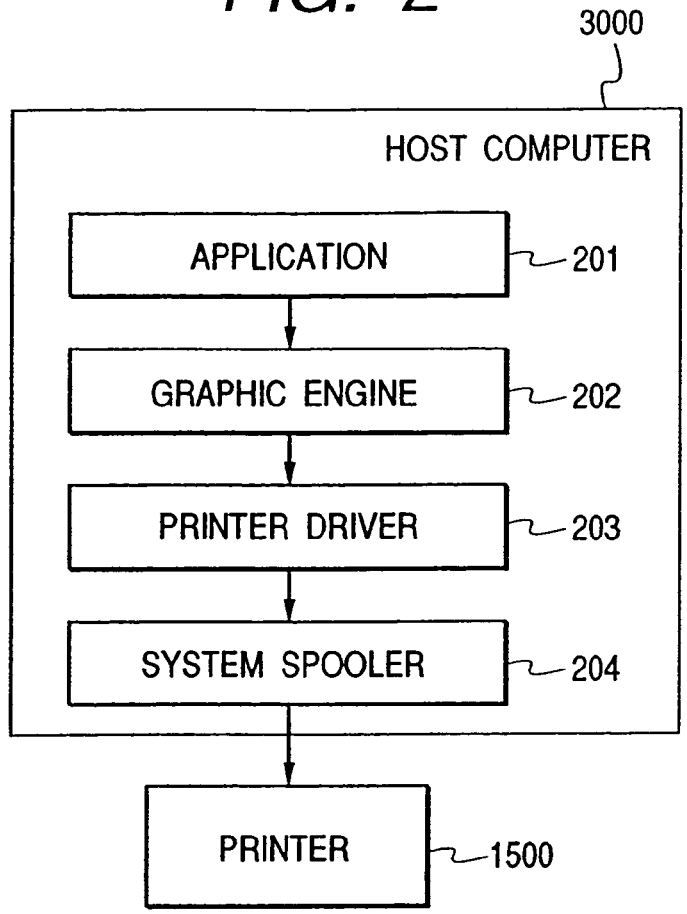
FIG. 2 is a block diagram for explaining a construction of a host computer in the print system shown in FIG. 1.

FIG. 2 is a block diagram for explaining a construction of the first host computer in the print system shown in FIG. 1 and corresponds to a construction of a program module on the host computer. The embodiment can be applied to a case of a host computer such that the host computer 3000 and printer 1500 are directly connected or are connected via the network.

In the diagram, an application 201, a graphic engine 202, a printer driver 203, and a system spooler 204 exist as files saved in the external memory 11 and function as a program module which is loaded into the RAM 2 and is executed by the OS or a module using the program module.

The application 201 and printer driver 203 can be installed at any time into an FD or a CD-ROM (not shown) as an external memory 11 or into an HD as an external memory 11 via a network (not shown). The application 201 saved in the external memory 11 is loaded into the RAM 2 and is executed. However, when the print is performed from the application 201 to the printer 1500, print data is outputted (drawn) by using the graphic engine 202 which has similarly been loaded in the RAM 2 and can be executed.

The graphic engine 202 similarly loads the printer driver 203 prepared every printing apparatus from the external memory 11 into the RAM 2 and converts the output of the application 201 into a control command of the printer 1500 by using the printer driver 203. The converted printer control command is outputted to the printer 1500 via the interface 21 through the system spooler 204 loaded in the RAM 2 by the OS.

Figure 3:
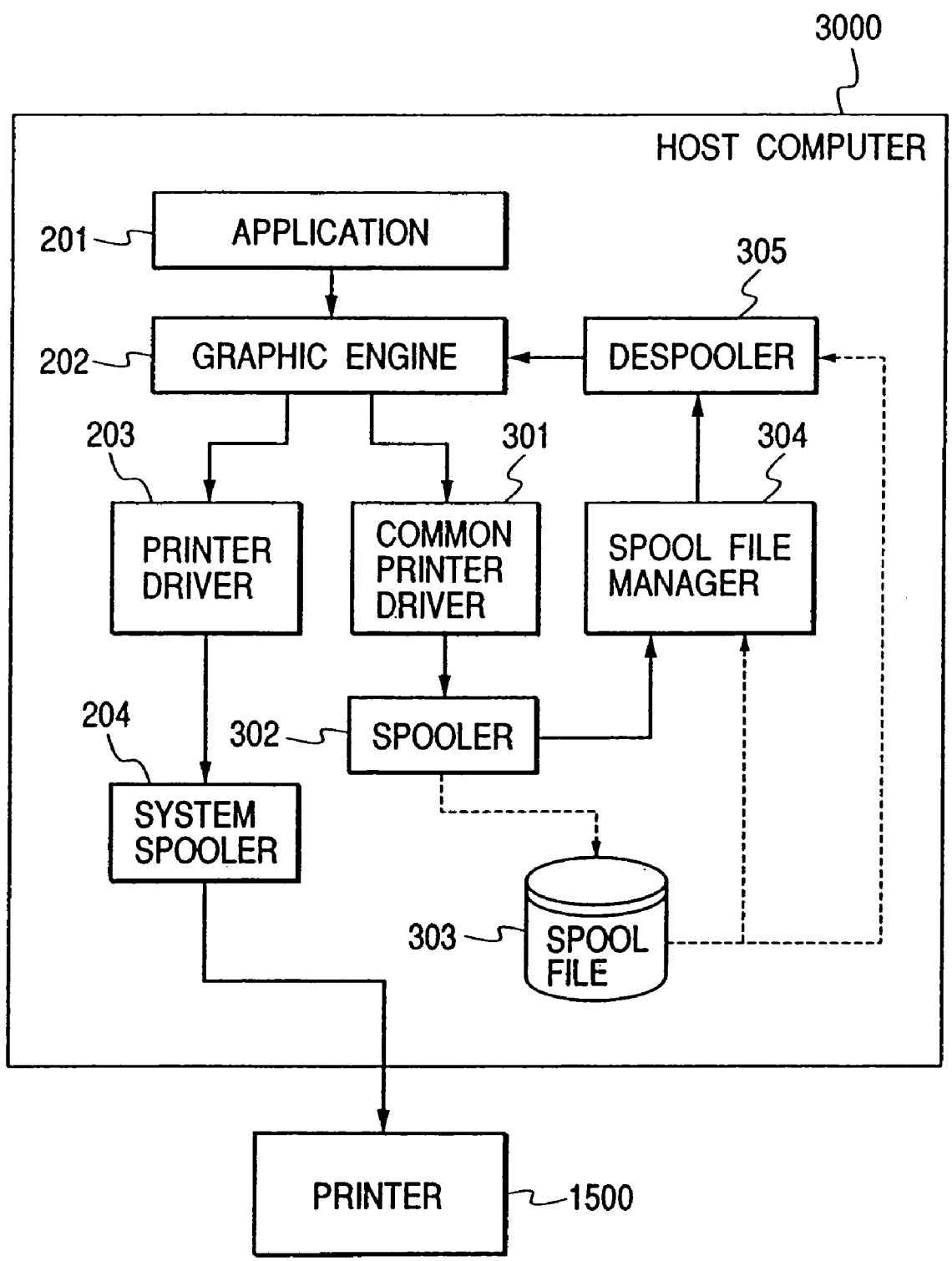
FIG. 3 is a block diagram for explaining in detail the construction of a host computer in the print system shown in FIG. 1.

Although the embodiment is made with respect to the print system comprising the printer and the host computer shown in FIG. 2 as a prerequisite, it is made further with regard to a system such that the print data from the application is once spooled by intermediate code data as shown in FIG. 3, which will be explained hereinlater, as a prerequisite.

FIG. 3 shows a construction which is obtained by expanding the system of FIG. 2 and in which a spool file 303 comprising intermediate codes is once formed when a print command is transmitted from the graphic engine 202 to the printer driver 203. In the print system shown in FIG. 2, the application 201 is released from the printing process at a time point when the printer driver 203 completes the conversion of all of print commands from the graphic engine 202 into control commands of the printer. In the system shown in FIG. 3, however, the application is released at a time point when a spooler 302 converts all print commands into intermediate code data and outputs them to the spool file 303. Usually, the processing time in the latter system is shorter than that in the former system. FIG. 3 will now be described in detail hereinbelow.

FIG. 3 is a block diagram for explaining a construction of a second host computer in the print system shown in FIG. 1 and the same component elements as those shown in FIG. 1 are designated by the same reference numerals. A construction and the operation will now be described hereinbelow.

In the expanded processing system, a common printer driver 301 receives a print command from the graphic engine 202. When the print command received by the common printer driver 301 from the graphic engine 202 is a print command issued from the application 201 to the graphic engine 202, the common printer driver 301 loads the spooler 302 stored in the external memory 11 into the RAM 2 and sends the print command to the spooler 302 instead of the printer driver 203. The spooler 302 converts the received print command into an intermediate code and outputs it to the spool file 303.

The spooler 302 obtains modification set contents regarding the print data set for the printer driver 203 from the printer driver 203 and saves into the spool file 303.

Although the spool file 303 is formed as a file on the external memory 11, it can be also formed on the RAM 2. Further, the spooler 302 loads a spool file manager 304 stored in the external memory 11 into the RAM 2 and notifies the spool file manager 304 of a forming situation of the spool file 303. After that, when it is determined that the print can be performed by again using the graphic engine 202, the spool file manager 304 loads a despooler 305 stored in the external memory 11 into the RAM 2 and instructs the despooler 305 to perform the printing process of the intermediate code described in the spool file 303.

The despooler 305 again outputs the intermediate code included in the spool file 303 to the printer driver 203 via the graphic engine 202. The printer driver 203 forms a printer control command and outputs it to the printer 1500 via the system spooler 204.

Figure 4:
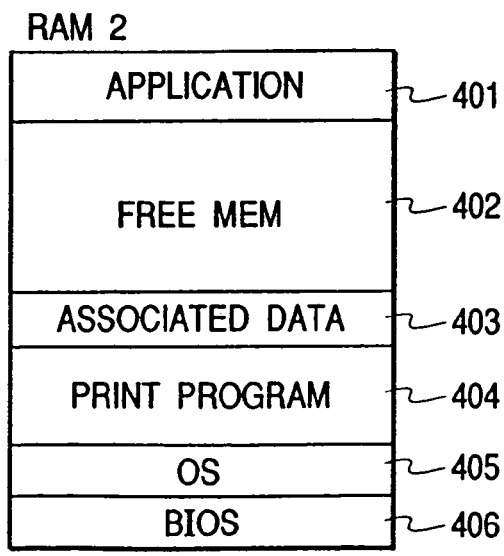
FIG. 4 is a block diagram showing a memory map in a state where a print associated module including a print mode automatic control program in the embodiment has been loaded into an RAM 2 of a host computer 3000 and can be executed.

FIG. 4 is a diagram showing an example of a memory map in the RAM 2 shown in FIG. 1 and corresponds to a state where the print program has been loaded into the RAM 2 on the host computer 3000 and can be executed. The print control program in the embodiment exists as a part of a print associated program 404.

In the diagram, reference numeral 401 denotes an application which is loaded from the external memory 11 or the like into the RAM 2; 402 a free memory which functions as a work memory of the CPU 1; 403 associated data; 404 the print associated program which is loaded from the external memory 11 or the like into the RAM 2; 405 an OS; and 406 a BIOS to control input/output devices (I/O devices).

Figure 5:
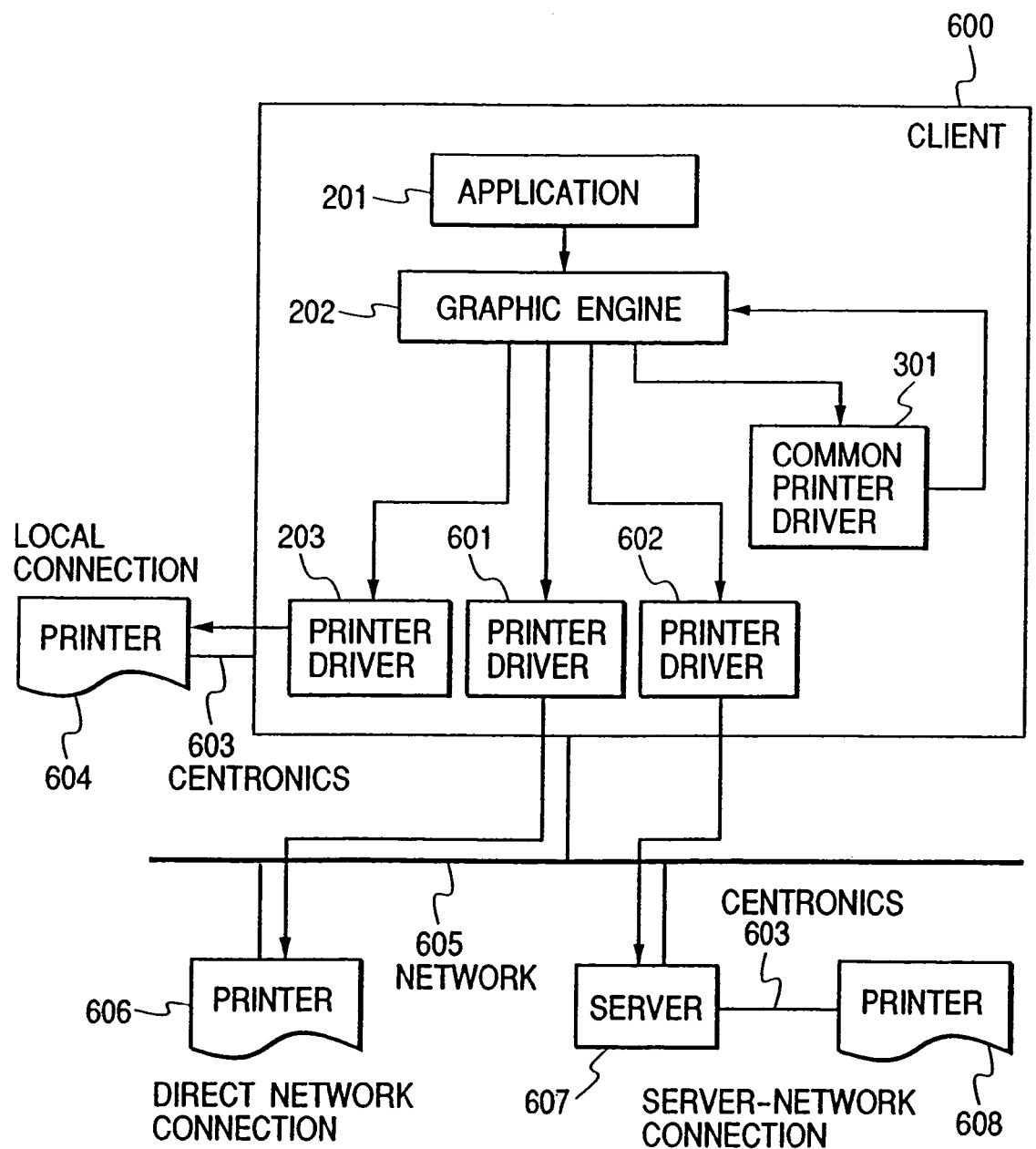
FIG. 5 is a block diagram for explaining the first print processing format in the print system according to the invention.

FIG. 5 is a block diagram for explaining the first print processing format in the print system according to the invention. Particularly, FIG. 5 corresponds to an example of the system in which printer drivers 203, 601, and 602 corresponding to printers which are local connected, directly network connected, and connected via a server and the common printer driver 301 exist in a client 600 to form print data.

In the diagram, the common printer driver 301 forms print data which does not depend on each printing apparatus on the network. Reference numeral 601 denotes the printer driver to form print data which depends on a printer 606; 602 the printer driver to form print data which depends on a printer 608 connected to a server 607; and 604 a printer which is connected as a local printer of the client 600 through a centronics interface 603.

The printer 608 is connected to the server 607 so that it can communicate therewith via the centronics I/F 603. The printer 606 has a network card and communicates with the printer driver 601 in accordance with a predetermined protocol.

Figure 6:
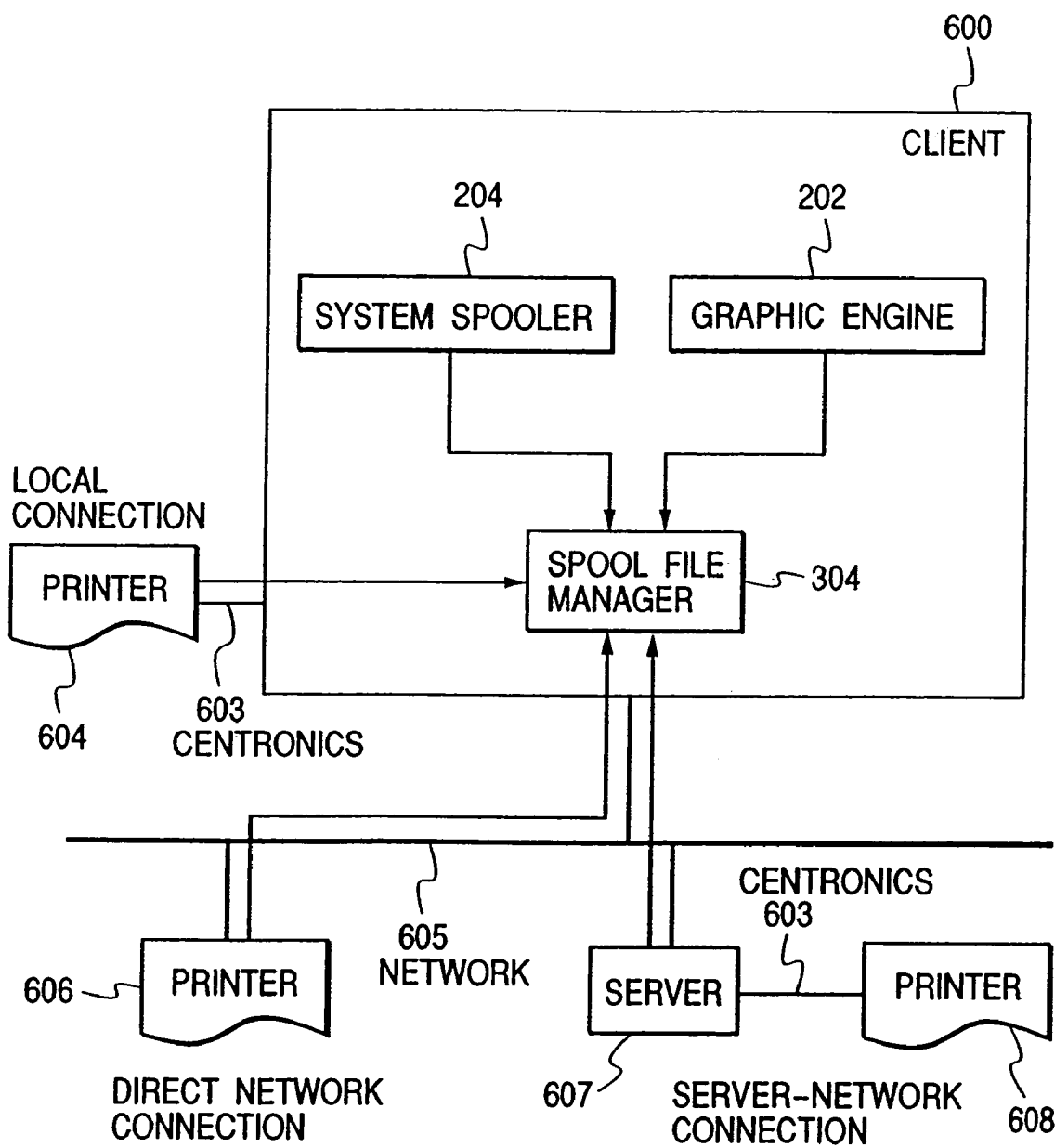
FIG. 6 is a block diagram for explaining the second print processing format in the print system according to the invention.

FIG. 6 is a block diagram for explaining the second print processing format in the print system according to the invention and the same component elements as those shown in FIGS. 1 and 5 are designated by the same reference numerals.

In the diagram, the spool file manager 304 monitors whether the print in each of the printers 604, 606, and 608 has successfully completed or not.

A characteristic construction of the embodiment will now be described hereinbelow with reference to FIG. 5 and the like.

There is provided a print control apparatus with the above construction which can communicate with a plurality of printing apparatuses (printers 604, 606, 608) through a predetermined communication medium (including the network and interface). The above print control apparatus comprises: first converting means (common printer driver 301) for converting drawing information which is required from the application 201 into a drawing object which does not depend on each printing apparatus; storing means for storing the drawing object converted by the first converting means; a plurality of second converting means (printer drivers 203, 601, 602) for converting the drawing object stored in the storing means into print control information that is peculiar to the printing apparatus that is selected and for transferring the print control information to each corresponding printing apparatus; discriminating means (spool file manager 304) for discriminating the occurrence of a print processing error by monitoring a print processing state for a time interval from the start of the converting process by any one of the second converting means until a printing process of any one of the printing apparatuses is finished; and control means for selecting any one of the second converting means corresponding to the set other printing apparatus when it is determined by the discriminating means that the print processing error has occurred in such one of the printing apparatuses (the CPU 1 of the host computer 3000 executes the control program stored in the ROM 3 or external memory 11 and performs a selection control). Therefore, the drawing object which does not depend on each printing apparatus is held until the printing process is successfully completed in the selected one of the printing apparatuses. When some error occurs during the printing process for the printing apparatus selected by the user, the set next alternate printing apparatus is selected. The peculiar print control information is converted from the stored drawing object and can be sequentially transferred to the selected printing apparatus. The selection burden of the candidates of the printing apparatuses of the user can be reduced. The print control information can be soon transferred to the printing apparatus of the next priority. The print environment such that the print processing time can be remarkably reduced and the printing process can be efficiently performed can be established.

Since the print processing error includes a conversion processing error by any one of the second converting means, a transfer error of the print control information which is converted by any one of the second converting means, and an engine operation error (for example, paper jam) of any selected one of the printing apparatuses. Therefore, the print processing error during a series of printing process is captured and the printing process can be dynamically switched from the selected printing apparatus to the printing process for the set other printing apparatus.

Further the print control apparatus has: setting means for setting, every printing apparatus, the printing apparatus of a next priority to which the drawing object stored in the storing means should be transferred when the print processing error occurs (the user arbitrarily sets by a GUI (not shown) of the host computer 3000); and memory means for storing a list of the printing apparatuses of a next priority which have been set by the setting means and to which the drawing object should be transferred (it is stored into the external memory 11 or the like and is loaded onto the RAM 2), wherein the control means selects any one of the second converting means corresponding to another printing apparatus set in the list of the printing apparatuses of the next priority (refer to the table shown in FIG. 8) stored in the memory means. Therefore, the print control information which is converted from the drawing object stored for the desired printing apparatus can be sequentially transferred in accordance with the priorities which are desired by the user.

Since the printing apparatus includes a local printer (printer 604) and network printers (printers 606 and 608), the alternate printing apparatus candidates at the time of the occurrence of a fault can be freely selected from various print environments.

Further, the network printers include: a first network printer (printer 606) which is connected to the predetermined communication medium via a server; and a second network printer (printer 608) which is directly connected to the predetermined communication medium. Therefore, the alternate network printer candidates at the time of the occurrence of a fault can be freely selected from various network printer environments.

The print control apparatus has second discriminating means for discriminating a compatibility between the printing apparatus of the next priority selected by the selecting means and the printing apparatus of the previous priority (the CPU 1 of the host computer 3000 executes the control program stored in the ROM 3 or external memory 11 and discriminates). The control means transfers the converted print control information to the printing apparatus of the next priority when it is determined by the second discriminating means that there is the compatibility between the printing apparatus of the next priority and the printing apparatus of the previous priority. Therefore, when an error occurs during the printing process to the selected printing apparatus, if the printing apparatus that is selected as a printing apparatus of the next priority has the compatibility with the printing apparatus of the previous priority, the print control information which has already been converted can be directly transferred. The re-converting process becomes unnecessary. The print processing time in the printing apparatus of the next priority can be remarkably reduced.

Figures 7, 8:
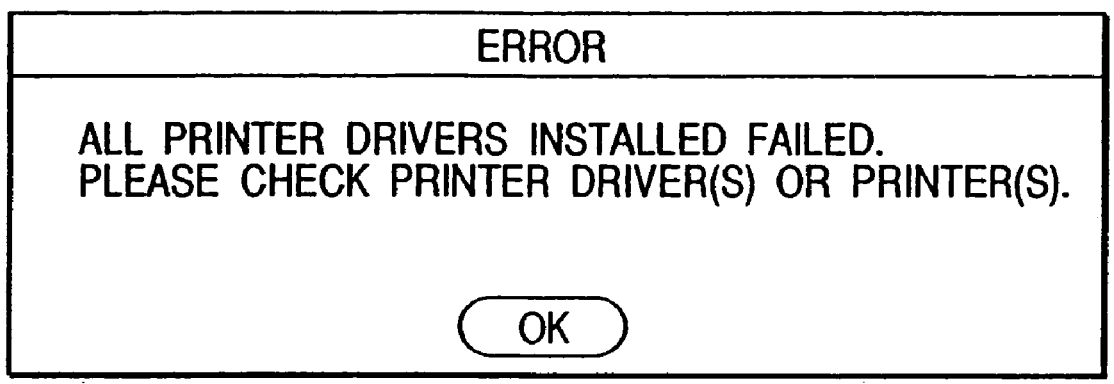
FIG. 7 is a diagram showing an example of a dialog message which is displayed in a display section of a client shown in FIGS. 5 and 6.
FIG. 8 is a diagram showing an example of a priority table of printer selection candidates which are stored and managed in the RAM 2 shown in FIG. 1 or an external memory.

FIG. 7 is a diagram showing an example of a dialog message which is displayed in the display section of the client shown in FIGS. 5 and 6 and corresponds to an example of a message when the print is unsuccessfully completed.

FIG. 8 is a diagram showing an example of a priority table of printer selection candidates which are stored and managed in the RAM 2 or external memory 11 shown in FIG. 1 and it is set every printer to be selected.

Figure 9:
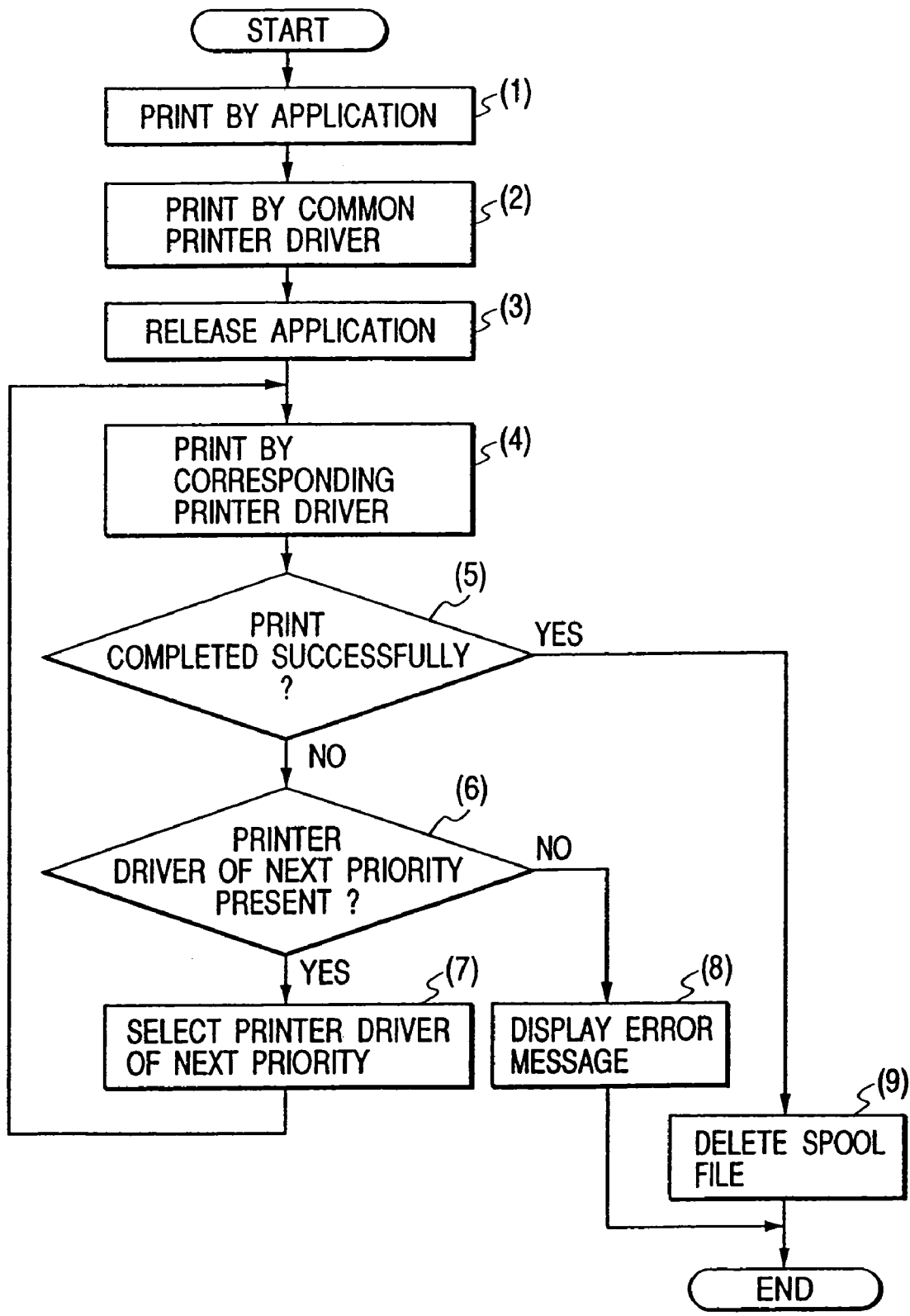
FIG. 9 is a flowchart showing an example of the first data processing procedure in the data processing apparatus according to the invention.

FIG. 9 is a flowchart showing an example of the first data processing procedure in the data processing apparatus according to the invention. Reference numerals (1) to (9) denote processing steps. A processing routine in the embodiment is loaded onto the RAM 2 under the management of the OS 405 as shown in FIG. 4 by operating the keyboard controller 5 or the like shown in FIG. 1 by the user and is started when the user designates a printer on the print destination side and instructs the execution of the print by the application 201 that is being executed.

For example, as shown in FIG. 5, when the print data can be outputted from the application 201 which operates on the client 600 to the three printers 604, 606, and 608 by using the printer drivers 203, 601, and 602, respectively, the user selects any one of the printer drivers 203, 601, and 602 and executes the print. In the following description using flowcharts of the embodiment, it is assumed that the printer driver selected by the user is the printer driver 203.

When the print start is instructed by the user, first in step (1), the application 201 allows the graphic engine 202 to execute the print command until all of the print data is extinguished. Subsequently, the graphic engine 202 which received the print command from the application 201 accesses the common printer driver 301 onto the RAM 2 in place of the printer driver 203 designated by the user and executes the print.

The common printer driver 301 accesses the spooler 302, converts the received print, command into the intermediate code of the print command, and saves it into the spool file 303. As mentioned above, when the common printer driver 301 converts all of the print commands from the graphic engine 202 into the intermediate codes, saves them into the spool file 303, and finishes the processes, the application 201 is released in step (3).

Subsequently in step (4), as already described in FIG. 3, the printer driver 203 corresponding to the printer 604 in which the print has been designated by the user via the spool file manager 304, despooler 305, and graphic engine 202 is set to an output destination and the print is executed.

In step (5), the spool file manager 304 discriminates whether the print has successfully been completed or not. The actual confirmation is performed by monitoring a processing situation of each module (whether it has successfully been completed or unsuccessfully completed) in a flow of the printing process. In the embodiment, as shown in FIG. 6, the successful completion is discriminated by monitoring the states of the graphic engine 202, system spooler 204, and printers 604, 606, and 608. As examples of the unsuccessful completion, a shortage of a memory capacity in the graphic engine 202, a shortage of the disk, a transmission error of the data to the printer in the system spooler 204, a paper jam in the printer, and the like can be mentioned.

When it is decided in step (5) that the print has successfully been completed, the spool file manager 304 deletes the spool file 303 in step (9) and all of the processes are finished.

When it is determined in step (5) that the print is not successfully completed, a check is made in step (6) to see if there is a printer driver of a next priority among the printer drivers which can be used in the host computer 3000. In the embodiment, as shown in FIG. 8, as a deciding method of the printer driver of the next priority, the user previously stores a table in which the priorities have been defined into the RAM 2 or external memory 11 and sequentially traces the priority defined table, so that it can be decided. As another method of deciding the printer driver of the next priority, it is also possible to use a method whereby the information which the printer drivers have is collected from each printer driver and stored into the external memory 11, a table showing the priorities of the printer drivers similar to the table of FIG. 8 is formed on the basis of those information in accordance with the compatibility with the printer driver designated as a print destination side upon print execution, location information of the printer (where the printer is installed), and the like, thereby deciding.

When it is determined in step (6) that there is the printer driver of the next priority, this driver is selected as a driver of the next priority in step (7). The processing routine is returned to step (4) and the despooler 305 instructs the graphic engine 202 to re-execute the print of the contents of the spool file 303.

In case of the embodiment, since the printer of the next priority of the printer 604 is the printer 608 as shown in FIG. 8, the printer driver 601 is selected as a driver of the next priority. As mentioned above, the printing process is performed while switching the printer drivers until the print is successfully completed or there is no printer driver of the next priority.

When it is determined in step (6) that the driver of the next priority does not exist, to notify the user of the result of the unsuccessful completion of the print, the error message shown in FIG. 7 is displayed to the CRT 10 in step (8). Subsequently in step (9), the spool file 303 is deleted and the processing routine is finished.

All of the printing processes from the application are finished by the above processes. The processes of the printing program in the embodiment are also finished and the data is deleted from the RAM 2 by the function of the OS 405.

In the embodiment, although the external memory 11 is used as a medium to record the printing program, any one of an FD drive, an HD drive, a CD-ROM, an IC memory card, and the like can be also used as an external memory 11.

Further, it is also possible to construct such that the printing program is recorded solely in the ROM 3 or is recorded therein together with programs which operate on the OS or the other host computer and is constructed so as to form a part of the memory map and is directly executed by the CPU 1.

A characteristic construction of the embodiment will now be described hereinbelow with reference to FIG. 9 or the like.

There is provided a data processing method with the above construction of a print control apparatus which can communicate with a plurality of printing apparatuses via a predetermined communication medium (including a network and an interface) or there is provided a memory medium with the above construction in which a computer readable program for controlling a data processing apparatus which can communicate with a plurality of printing apparatuses through a predetermined communication medium has been stored. The above data processing method or the above computer readable program stored in the memory medium comprises: a first converting step (step (2) in FIG. 9) of converting drawing information which is required from an application into a drawing object which does not depend on each printing apparatus; a storing step (step (2) in FIG. 9) of storing the drawing object converted by the first converting step into a memory; a plurality of second converting steps (step (4) in FIG. 9) of converting the drawing object stored in the memory by the storing step into print control information that is peculiar to the printing apparatus that is selected and transferring the print control information to each corresponding printing apparatus; a discriminating step (step (5) in FIG. 9) of discriminating the occurrence of a print processing error by monitoring a print processing state for a time interval from the start of the converting process by any one of the second converting steps until a printing process of any one of the printing apparatuses is finished; and a selecting step (steps (6) and (7) in FIG. 9) of selecting any one of the second converting steps corresponding to the set other printing apparatus when it is determined by the discriminating step that the print processing error has occurred in such one of the printing apparatuses. Therefore, the drawing object which does not depend on each printing apparatus is held until the printing process is successfully completed in the selected one of the printing apparatuses, and when some error occurs during the printing process to the printing apparatus selected by the user, the set next alternate printing apparatus is selected, and the peculiar print control information is converted from the stored drawing object and can be sequentially transferred to the selected printing apparatus. The selection burden of the printing apparatus candidates of the user can be reduced. The print control information can be soon transferred to the printing apparatus of the next priority. The print environment in which the print processing time is remarkably reduced and the printing process can be efficiently performed can be established.

The print processing error includes a conversion processing error by any one of the second converting steps, a transfer error of the print control information which is converted by any one of the second converting steps, and an engine operation error of any selected one of the printing apparatuses. Therefore, the print processing error during the series of printing processes is captured and the printing process can be dynamically switched from the selected printing apparatus to the set other printing apparatus.

Further, the data processing method or the computer readable program stored in the memory medium further has: a setting step (not shown) of setting, every printing apparatus, the printing apparatus of a next priority to which the drawing object stored in the memory should be transferred when the print processing error occurs; and a registering step (not shown) of registering a list of the printing apparatuses of a next priority which have been set by the setting step and to which the drawing object should be transferred into the memory, wherein the selecting step selects any one of the second converting steps corresponding to another printing apparatus set in the list of the printing apparatuses of the next priority stored in the memory. Therefore, the print control information which is converted from the drawing object stored can be sequentially transferred to the desired printing apparatus in accordance with the priority which is desired by the user.

Since the printing apparatus includes a local printer (printer 604) and network printers (printers 606 and 608), the alternate printing apparatus candidate at the time of the occurrence of a fault can be freely selected from various print environments.

Further, the network printers include: a first network printer (printer 606) which is connected to the predetermined communication medium via a server; and a second network printer (printer 608) which is directly connected to the predetermined communication medium. Therefore, the alternate network printer candidate at the time of the occurrence of a fault can be freely selected from various network printer environments.

Second Embodiment

Figures 10, 11:
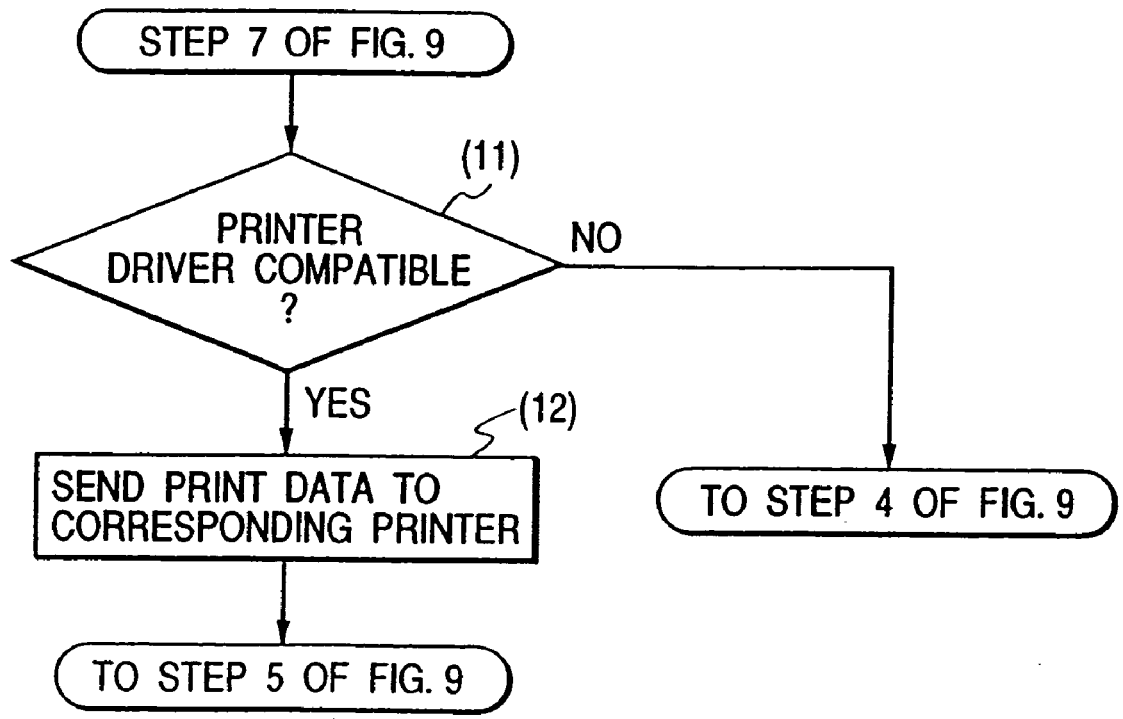
FIG. 10 is a diagram showing an example of a printer selection priority table which is stored in a data processing apparatus showing the second embodiment of the invention.
FIG. 11 is a flowchart showing an example of the second data processing procedure in the data processing apparatus according to the invention.

The first embodiment has a structure such that when it is detected in step (5) shown in FIG. 9 that the print is not successfully completed, the printer driver of the next priority is determined in step (7) and the print is re-executed by using the printer driver selected as a printer driver of the next priority. However, as shown in FIG. 10, it is also possible to construct in a manner such that a compatibility flag is added to the table showing the priorities and the formed print data when the print is not successfully completed is transmitted to the printer of the next priority without re-executing the print, thereby re-executing the print. Such an embodiment will now be described hereinbelow.

FIG. 10 is a diagram showing an example of a printer selection priority table which is stored in the data processing apparatus showing the second embodiment of the invention. It is assumed that this table is stored in the external memory 11 or the like.

FIG. 11 is a flowchart showing an example of the second data processing procedure in the data processing apparatus according to the invention and only a main procedure is shown. Reference numerals (11) and (12) denote processing steps and the other processes are similar to those in FIG. 9.

Although not shown, in the print execution by the printer driver on the output destination in step (4) shown in FIG. 9, the print data formed by the printer driver is generally written into a temporary saving file which is managed by the system spooler 204 and, after that, it is transmitted to the printer actually connected to the client 600. In the embodiment, however, the output of the printer driver is once written and saved into the temporary saving file under the management of the spool file manager 304. After the saving was finished, the writing and saving of the print data into the temporary saving file which is managed by the system spooler 204 are performed in a final print data format.

The temporary saving file under the management of the spool file manager 304 is deleted by the spool file deleting process in step (9) in a manner similar to the spool file 303 of the intermediate code format.

First in step (7) shown in FIG. 9, when it is known that the printer driver is the driver of the next priority, a check is further made in step (11) to see if the driver of the next priority has a compatibility with the printer driver which has already performed the print with reference to the table shown in FIG. 10. When it is decided that there is no compatibility, the processing routine is returned to the process in step (4) shown in FIG. 9.

When it is determined in step (11) that there is the compatibility, the file of the final print data format managed by the spool file manager 304 is opened in step (12) and the data is transmitted to the printer on the output destination side. After completion of this process, the processing routine is returned to the process in step (5) shown in FIG. 9.

For example, when the printer designated by the user as an output destination is the printer 604 and some error occurs before the end of the print to the printer, it is known that the printer of the next priority is the printer 606 and the compatibility exists in accordance with the next candidate information and the compatibility information shown in FIG. 10.

In this case, therefore, there is no need to re-execute the print to the graphic engine 202 by using the spool file 303 of the intermediate data format which is managed by the spool file manager 304. By transmitting the temporary saving file saved in the final print data format to the printer, the print to the printer 606 is performed. If the print is not successfully completed even in the printer 606, since it is known that the printer 608 is the final candidate and there is no compatibility with reference to the item of the printer 604 shown in FIG. 10, the ordinary printing process by step (4) is executed to the printer 608.

A characteristic construction of the embodiment will now be described hereinbelow with reference to a flowchart shown in FIG. 11.

There is provided a data processing method with the above construction of a print control apparatus which can communicate with a plurality of printing apparatuses through a predetermined communication medium or there is provided a memory medium in which a computer readable program for controlling a data processing apparatus which can communicate with a plurality of printing apparatuses through a predetermined communication medium has been stored. The above data processing method or the above computer readable program stored in the memory medium has: a second discriminating step (step (11) in FIG. 11) of discriminating a compatibility between the printing apparatus of the next priority selected by the selecting step and a printing apparatus of a previous priority; and a transferring step (step (12) in FIG. 11) of transferring the converted print control information to the printing apparatus of the next priority when it is determined by the second discriminating step that there is the compatibility between the printing apparatus of the next priority and the printing apparatus of the previous priority. Therefore, when an error occurs during the printing process to the selected printing apparatus, if the printing apparatus which is selected as a printing apparatus of the next priority has the compatibility with the printing apparatus of the previous priority, the print control information which has already been converted can be directly transferred and the re-converting process is unnecessary. The print processing time in the printing apparatus of the next priority can be remarkably reduced.

A construction of a data processing program which can be read out by a print system to which the data processing apparatus according to the invention can be applied will now be described hereinbelow with reference to a memory map shown in FIG. 12.

FIG. 12 is a diagram for explaining the memory map of the memory medium to store various data processing programs which can be read out by the print system to which the data processing apparatus according to the invention can be applied.

Although not particularly shown, information to manage the programs which are recorded into the memory medium, for example, version information, persons who made the programs, and the like are also stored. There is also a case where information depending on the OS or the like on the program reading side, for example, icons or the like to display the programs so that they can be identified are stored.

Further, the data depending on various programs is also managed in a directory. There is also a case where a program to install various programs into a computer or, if the program to install has been compressed, a program to decompress the compressed program, and the like are stored.

The functions shown in FIGS. 9 and 11 in the embodiment can be also executed by the host computer in accordance with a program that is installed from the outside. In this case, the invention can be also applied even in the case where a group of information including the program is supplied to the output apparatus by a memory medium such as CD-ROM, flash memory, FD, or the like or from an external memory medium through a network.

It will be obviously understood that the object of the invention is accomplished by a method whereby a memory medium in which program codes of software to realize the functions of the foregoing embodiments have been recorded as mentioned above is supplied to a system or an apparatus and a computer (or a CPU or an MPU) of the system or apparatus reads out and executes the program codes stored in the memory medium.

In this case, the program codes themselves read out from the memory medium realize a novel function of the present invention and a memory medium in which the program codes have been recorded constructs the invention.

As a memory medium to supply the program codes, for example, it is possible to use any one of, for example, a floppy disk, a hard disk, an optical disk, a magnetooptic disk, a CD-ROM, a CD-R, a magnetic tape, a non-volatile memory card, an ROM, an EEPROM, or the like.

It will be also obviously understood that not only a case where the functions of the foregoing embodiments are realized by executing the read-out program codes by the computer but also a case where the OS (operating system) or the like which is operating on the computer executes a part or all of the actual processes in response to instructions of the program codes and the functions of the embodiments mentioned above are realized by those functions.

Further, it will be obviously understood that the invention also incorporates a case where the program codes read out from the memory medium are written into a memory provided for a function expanding board inserted into a computer or a function expanding unit connected to the computer and, after that, a CPU or the like provided for the function expanding board or the function expanding unit executes a part or all of the actual processes on the basis of instructions of the program codes, and the functions of the foregoing embodiments are realized by those processes.

Third Embodiment

The third embodiment of the invention will now be described hereinbelow with reference to the drawings. It is an object of the third embodiment to provide print control apparatus and method for realizing that a fault during the print execution is avoided and the print is certainly executed without troubling the user. Another object of the invention is to enable a print output desired by the user to be performed by notifying the user of a problem that is caused due to the change of the printing apparatus on the output destination or by solving the problem by the alternate means.

The print control apparatus comprises: print control means for forming data which does not depend on a printing apparatus to execute the print; means for converting the data which was formed by the print control means and does not depend on the printing apparatus into print data to an arbitrary printing apparatus; means for transmitting the print data to the printing apparatus; means for monitoring until the completion of the print of the transmitted print data; means for changing a printing apparatus on the output destination side on the basis of the data which does not depend on the printing apparatus in the case where the print is unsuccessfully completed due to some causes, for converting into the print data to the changed printing apparatus, and for executing the print.

The diagrams of FIGS. 1 to 4 mentioned above are also commonly used. The invention can be applied to any one of sole equipment, a system comprising a plurality of equipment, and a system which is connected through a network such as LAN, WAN, or the like and in which processes are executed so long as the functions of the invention are executed.

In FIG. 1, reference numeral 18 denotes the foregoing operation panel on which switches for the operation, an LED display, and the like are arranged.

As a foregoing external memory 14, the number of external memories is not limited to one but a plurality of external memories can be provided. That is, it is possible to construct such that in addition to built-in fonts, option cards and a plurality of external memories in which programs to interpret printer control languages of different language systems have been stored can be connected. Further, the apparatus can also have an NVRAM (not shown) and store printer mode set information from the operation panel 1501. A subsequent description up to FIG. 4 is omitted hereinbelow because it is overlapped to that mentioned above.

FIG. 2 is the constructional block diagram of a typical printing process in the host computer to which the printing apparatuses such as printers or the like are directly connected or are connected via the network. The application 201, graphic engine 202, printer driver 203, and system spooler 204 exist as files saved in the external memory 11 and are program modules which are loaded into the RAM 2 and are executed by the OS or a module using the program module when they are executed. The application 201 and printer driver 203 can be added to an FD of the external memory 11 or a CD-ROM (not shown) or into an HD as an external memory 11 via a network (not shown). The application 201 saved in the external memory 11 is loaded into the RAM 2 and is executed. However, when the print is performed from the application 201 to the printer 1500, print data is outputted (drawn) by using the graphic engine 202 which has similarly been loaded in the RAM 2 and can be executed. The graphic engine 202 similarly loads the printer driver 203 prepared every printing apparatus from the external memory 11 into the RAM 2 and converts the output of the application 201 into a control command of the printer by using the printer driver 203. The converted printer control command is outputted to the printer 1500 via the interface 21 through the system spooler 204 loaded in the RAM 2 by the OS.

Although the embodiment is made with respect to the print system comprising the printer and the host computer shown in FIG. 2 as a prerequisite, it is made further with regard to a system such that the print data from the application is once spooled by the intermediate code data as shown in FIG. 3 as a prerequisite. FIG. 3 shows a construction which is obtained by expanding the system of FIG. 2 and in which the spool file 303 comprising the intermediate codes is once formed when a print command is transmitted from the graphic engine 202 to the printer driver 203. In the print system shown in FIG. 2, the application 201 is released from the printing process at a time point when the printer driver 203 completes the conversion of all of print commands from the graphic engine 202 into the control commands of the printer. In the system shown in FIG. 3, however, the application is released at a time point when the spooler 302 converts all print commands into intermediate code data and outputs them to the spool file 303. Usually, the processing time in the latter system is shorter than that in the former system.

FIG. 3 will now be described in detail hereinbelow. As shown in the diagram, according to the expanded processing system, the common printer driver 301 receives the print command from the graphic engine 202. When the print command received by the common printer driver 301 from the graphic engine 202 is a print command issued from the application 201 to the graphic engine 202, the common printer driver 301 loads the spooler 302 stored in the external memory 11 into the RAM 2 and sends the print command to the spooler 302 instead of the printer driver 203. The spooler 302 converts the received print command into an intermediate code and outputs it to the spool file 303. The spooler 302 obtains modification set contents regarding the print data set for the printer driver 203 from the printer driver 203 and saves into the spool file 303. Although the spool file 303 is formed as a file on the external memory 11, it can be also formed on the RAM 2. Further, the spooler 302 loads the spool file manager 304 stored in the external memory 11 into the RAM 2 and notifies the spool file manager 304 of a forming situation of the spool file 303. After that, when it is determined that the print can be performed by again using the graphic engine 202, the spool file manager 304 loads the despooler 305 stored in the external memory 11 into the RAM 2 and instructs the despooler 305 to perform the printing process of the intermediate code described in the spool file 303. The despooler 305 again outputs the intermediate code included in the spool file 303 to the printer driver 203 via the graphic engine 202. The printer driver 203 forms a printer control command and outputs it to the printer 1500 via the system spooler 204.

FIG. 4 is a diagram showing the memory map in a state where the print program in the embodiment has been loaded into the RAM 2 on the host computer 3000 and can be executed. The print control program in the embodiment exists as a part of the print associated program 404.

Figure 13:
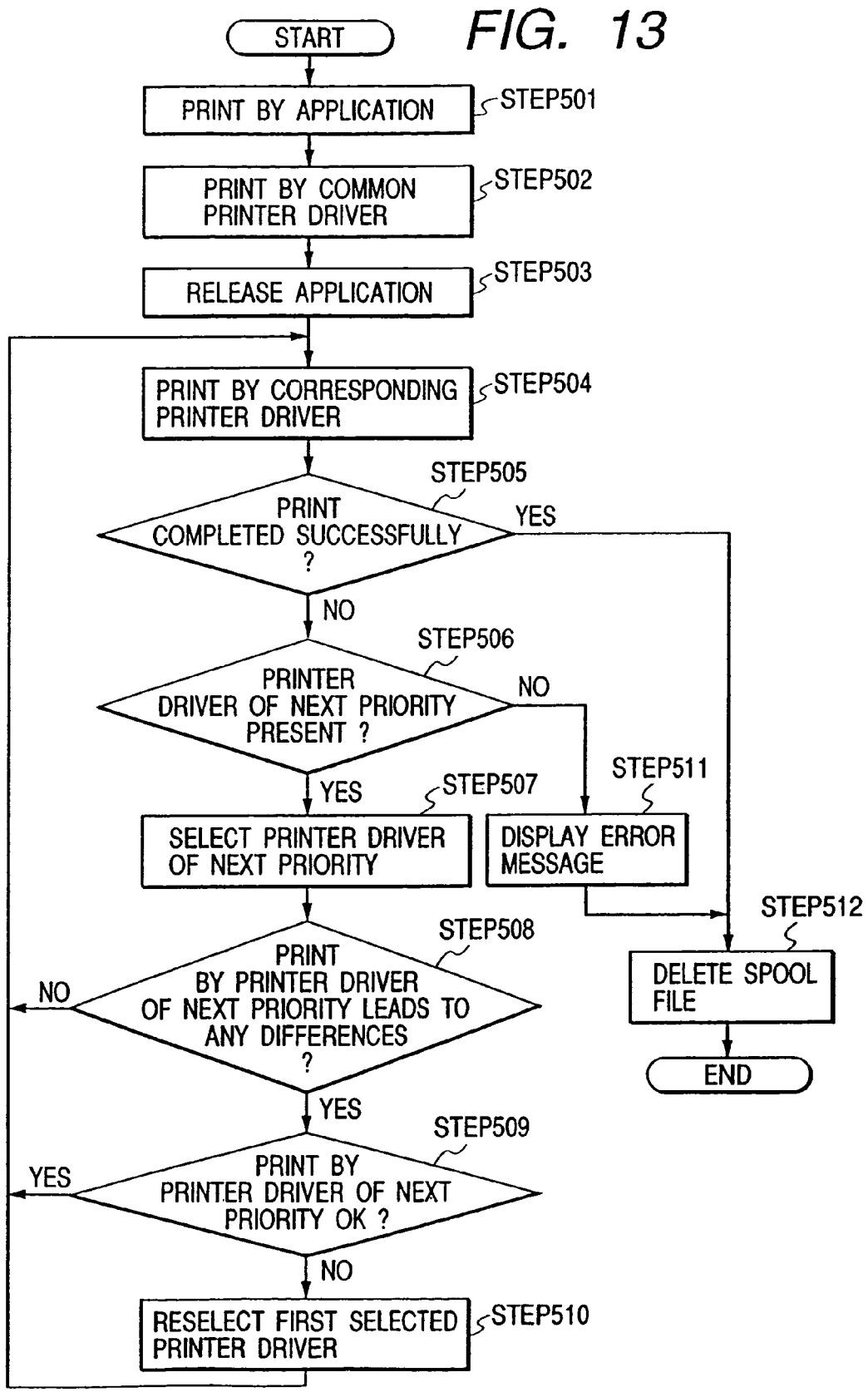
FIG. 13 is a flowchart showing the contents of the processes in the embodiment.

The third embodiment will now be described hereinbelow with reference to FIGS. 13 to 19. FIG. 13 is a flowchart showing the contents of the processes in the third embodiment.

Figure 14:
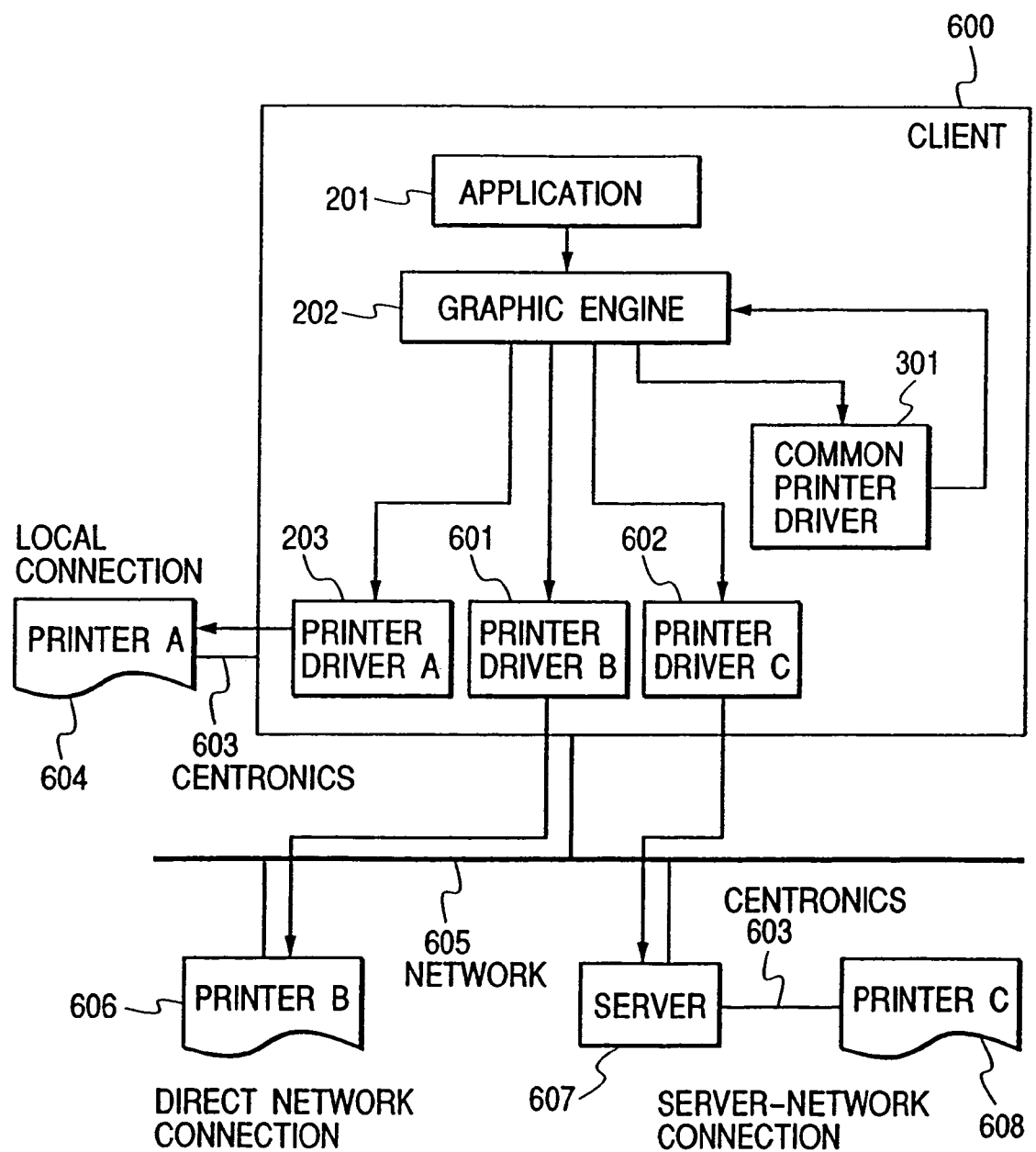
FIG. 14 is a diagram showing an example of a system construction in the embodiment.

FIG. 14 shows an example of a system construction in the embodiment. A state where printer drivers A, B, and C corresponding to the printers which are local-connected, directly connected, and connected via the server in the client 600 to form the print data in the diagram is simply illustrated.

Figure 15:
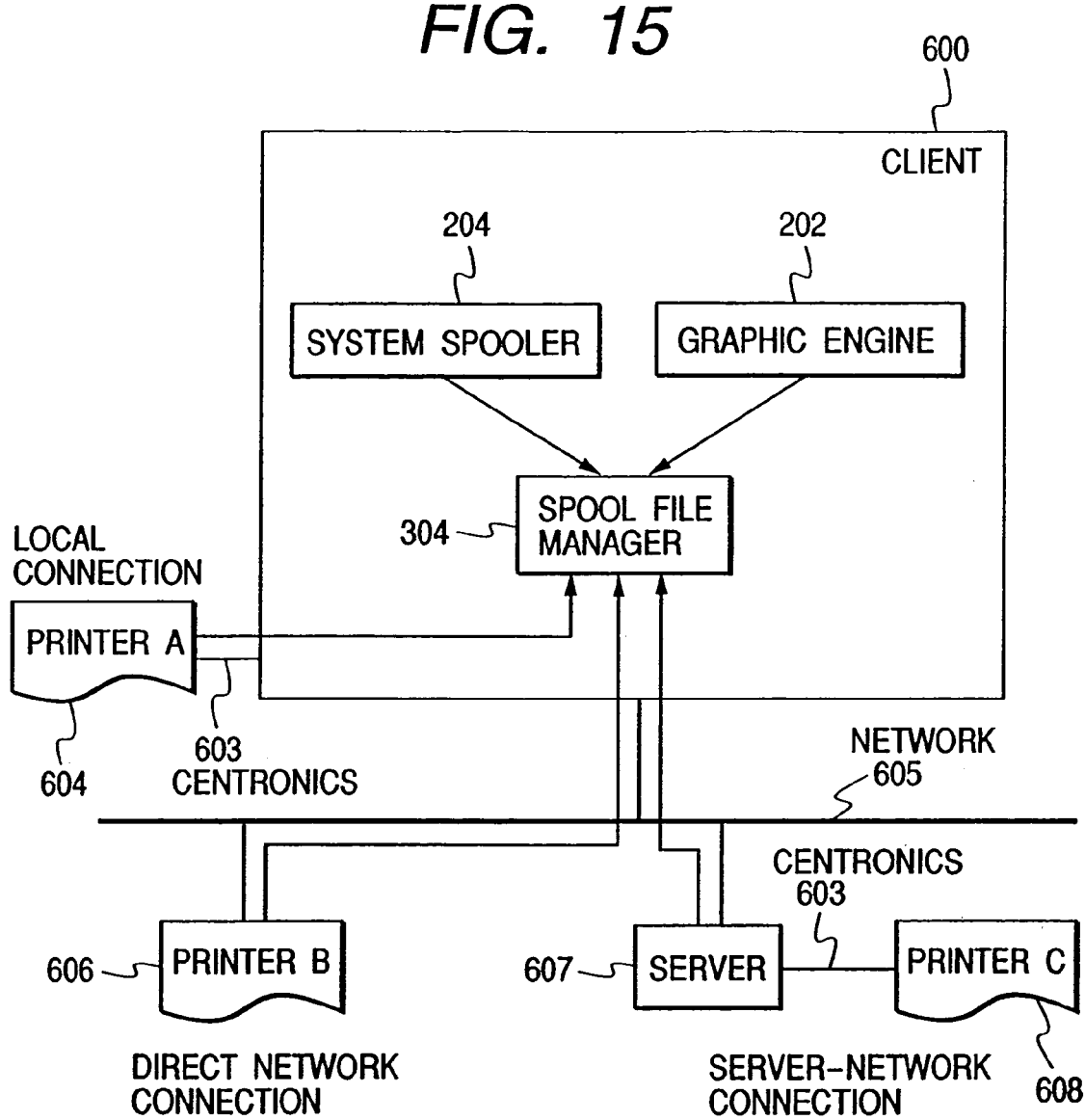
FIG. 15 is a diagram showing an example of a construction to monitor whether the print has successfully completed or not.

FIG. 15 shows an example of a construction to monitor whether the print has successfully been completed or not.

Figure 16:
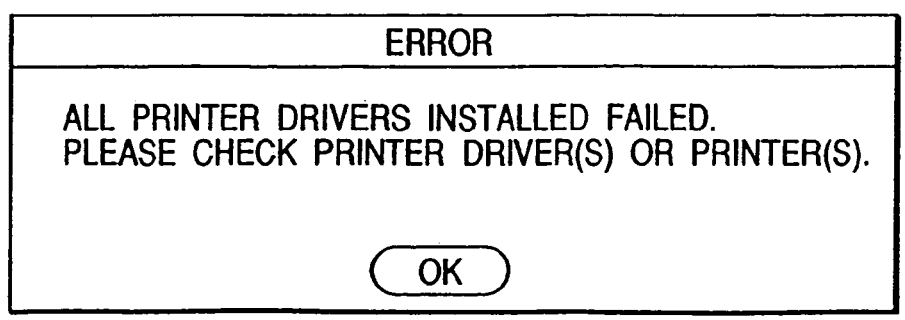
FIG. 16 is a diagram showing a display example of an error message when the print is unsuccessfully completed.
Figures 17, 18:
FIG. 17 is a diagram showing an example of information indicative of the print priority.
FIG. 18 is a diagram showing a display example of a message which is displayed when there is a print designation which is made ineffective in case of executing the print by a printer of a next priority.
Figure 19:
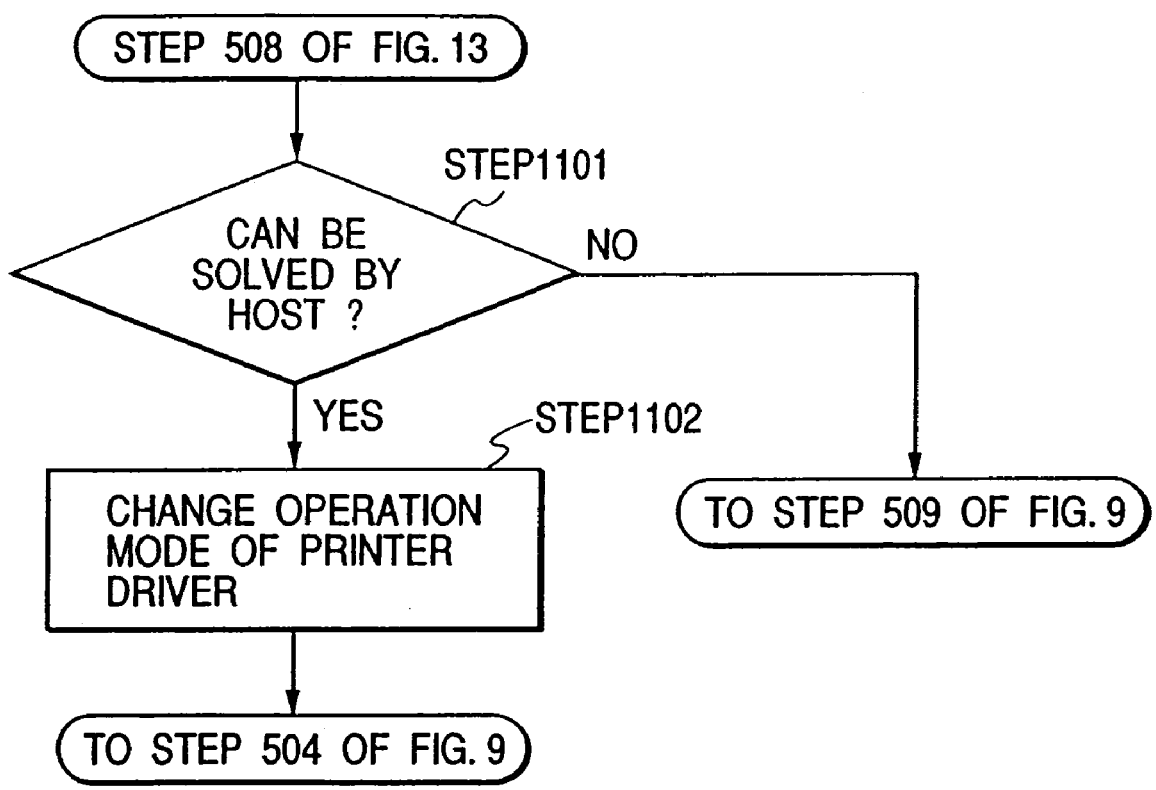
FIG. 19 is a flowchart showing the contents of processes in another embodiment.

FIG. 16 shows an example of a display of an error message when the print is unsuccessfully completed. FIG. 17 shows an example of information showing the print priorities. FIG. 18 shows an example of a display of a message that is displayed when there is a print designation which will be made ineffective in case of executing the print to the printer of the next priority. The embodiment will now be described in detail hereinbelow mainly with reference to the flowchart shown in FIG. 13.

First, as shown in FIG. 13, the processing routine in the embodiment is loaded into the RAM 2 under the management of the OS 405 as shown in FIG. 4 and is started when the user designates the printer on the print destination side and instructs the print execution by the application 201 under execution by using the keyboard controller KBC 5 or the like shown in FIG. 1. For example, in the case where the data can be outputted to the three printers A, B, and C from the application which operates on the client 600 as shown in FIG. 14 by using the printer drivers A, B, and C, the user selects any one of the printer drivers A, B, and C and executes the print. In the following description using the flowchart of the embodiment, it is assumed that the printer driver selected by the user at this time is the printer driver A 203. When the print is instructed by the user, the application 201 instructs the graphic engine 202 to execute the print command until all of the print data is extinguished (step 501). The graphic engine 202 which received the print command from the application 201 accesses the common printer driver 301 onto the RAM 2 in place of the printer driver A 203 designated by the user and executes the print. The common printer driver 301 accesses the spooler 302, converts the received print command into the intermediate code of the print command, and saves it into the spool file 303 (step 502). As mentioned above, when the common printer driver 301 converts all of the print commands from the graphic engine 202 into the intermediate codes, saves them into the spool file, and finishes the processes, the application 201 is released (step 503). Subsequently, as already described in FIG. 3, the printer driver A 203 corresponding to the printer A 604 in which the print has been designated by the user via the spool file manager 304, despooler 305, and graphic engine 202 is set to an output destination and the print is executed (step 504). The spool file manager 304 discriminates whether the print in step 504 has successfully been completed or not. The actual confirmation is performed by monitoring a processing situation of each module (whether it has successfully been completed or unsuccessfully completed) in a flow of the printing process. In the embodiment, as shown in FIG. 15, the successful completion is discriminated by monitoring the states of the graphic engine 202, system spooler 204, and printers A, B, and C. As examples of the unsuccessful completion, a shortage of a memory capacity in the graphic engine 202, a shortage of the disk, a transmission error of the data to the printer in the system spooler 204, a paper jam in the printer, and the like can be mentioned (step 505). When it is now decided that the print has successfully been completed or when there is no need to discriminate whether the print has successfully been completed or not, the spool file manager 304 deletes the spool file 303 and all of the processes are finished (step 512). As an example in the case where there is no need to discriminate whether the print has successfully been completed or not, as will be explained hereinlater, there is a case where since an error occurred in the printer in which it has initially been tried to print, although it is intended to print by the printer of the next priority, a part of the print output is not compatible, so that the data is again outputted to the original printer. On the other hand, when the print is not successfully completed, a check is made to see if there is a printer driver of a next priority among the printer drivers which can be used in the host computer 3000 (step 506). As a deciding method of the printer driver of the next priority, the user previously stores a table in which the priorities have been defined into the RAM 2 or external memory 11 and sequentially traces the priority defined table, so that it can be decided. As another method of deciding the printer driver of the next priority, it is also possible to use a method whereby the information which the printer drivers have is collected from each printer driver and stored into the external memory 11, a table showing the priorities of the printer drivers similar to the table of FIG. 17 is formed on the basis of those information in accordance with the compatibility with the printer driver designated as a print destination side upon print execution, location information of the printer (where the printer is installed), and the like, thereby deciding. When the printer driver of the next priority does not exist, a message shown in FIG. 16 is displayed on the CRT 10 (step 511) in order to notify the user of a result of the unsuccessful completion of the print. Subsequently, the spool file 303 is deleted and the processes are finished (step 512). On the other hand, if there is the printer driver of the next priority, such a driver is selected as a driver of the next priority (step 507). In case of the embodiment, since the next candidate is the printer B as shown in FIG. 17, the printer driver B is selected as a next candidate. Subsequently, an evaluation about whether a difference between the prints does not occur or not when the print is executed by the printer driver B which is subsequently selected and by the printer driver A which was inherently selected is performed by obtaining information from the common printer driver to each printer driver via a predetermined interface for inquiry. Although there are various checking items about the difference between the prints, for instance, items such as permission/inhibition of a double-sided printing mode, output paper size, permission/inhibition of staple, sort, binding print, and the like can be mentioned (step 508). When there is no difference between the prints, the despooler 305 instructs the graphic engine 202 to re-execute the print of the contents in the spool file 303 (step 504). The printing process is performed while the printer drivers are switched until the print is successfully completed or until the printer driver of the next priority does not exist as mentioned above. When it is determined that the difference between the prints occurs, a message as shown in FIG. 18 is displayed to the CRT 10 in order to notify the user of such a fact. The user is allowed to confirm whether the print is continued by the printer driver of the next priority or not. FIG. 18 shows a state where the double-sided printing mode is impossible in case of executing the print by using the printer driver B of the next priority (step 509). When the continuation of the print is selected, the despooler 305 instructs the graphic engine 202 to re-execute the print of the contents of the spool file 303 (step 504). When the stop of the print is selected, on the other hand, the selection of the printer driver of the next priority is changed so as to again print by the initially selected printer driver without printing by the printer driver of the next priority (step 510). Subsequently, the despooler 305 instructs the graphic engine 202 to re-execute the print of the contents of the spool file 303 (step 504). In this case, however, after the print error once occurred, since the print is retried to the same printer, the discrimination about the end of the print is not performed, the spool file 303 is deleted, and the processes are finished (step 512).

All of the printing processes from the application are finished by the above processing routine, the processes of the printing program in the embodiment are also finished, and the data is deleted from the RAM 2 by the function of the OS 405. In the embodiment, although the external memory is used as a medium to record the printing program, any one of an FD drive, an HD drive, a CD-ROM, an IC memory card, and the like can be also used as an external memory. Further, it is also possible to construct such that the printing program is recorded solely in the ROM 3 or is recorded therein together with programs which operate on the OS or the other host computer and is constructed so as to form a part of the memory map and is directly executed by the CPU 1.

Further Another Embodiment

In the above embodiments, when there is a function which cannot be executed by the driver of the next priority in response to the print instruction of the user in step 508, the user is allowed to confirm whether the print is continued or not in step 509. In the embodiment, however, as a process between steps 508 and 509, a process to change the operating mode of the printer driver to a mode for substituting the functions which can be substituted by the processes on the printer driver side among the functions which cannot be processed due to the printer function is added. This process will now be described hereinbelow with reference to FIG. 19.

First in step 508, when it is determined that there is the print instruction of the user showing that it cannot be executed by the driver of the next priority, a check is made to see if the print instruction instructed by the user cannot be executed by the driver of the next priority due to the printer, and further, whether the limitation due to the printer can be substituted by the processes on the host side or not is also performed (step 1101). It is effective to perform the above two discriminating processes by, for example, obtaining the information by a predetermined interface for inquiry. A table, a database, or the like in which the abilities of the printer drivers are gathered can be also obviously used. If it cannot be substituted, the processing routine is returned to the process in step 509 as it is. When it can be substituted, subsequently, to realize the relevant function by the function on the printer driver side instead of the printer function, the operating mode of the printer driver is changed (step 1102). In this case, the process in step 509 is skipped and the processing routine directly advances to the process in step 504. For instance, as printer functions which can be substituted by the printer driver, there are a regular size enlargement or reduction of the paper size, a zoom, a page layout print (N pages, poster, or the like), a print of a copy unit basis, a binding print, and the like. As printer functions which cannot be substituted by the printer driver, functions which can be realized by only devices such as designation of a paper feed port, designation of a paper ejection port, staple, double-sided printing mode, and the like can be mentioned. As for the subsequent processes, in a manner similar to those in the foregoing embodiments, the despooler 305 instructs the graphic engine 202 to re-execute the print of the contents of the spool file 303 (step 504). When the print is successfully completed, the spool file 303 is deleted and the processing routine is finished (step 512).

All of the printing processes from the application are finished by the above processing routine, the processes of the printing program in the embodiment are also finished, and the data is deleted from the RAM 2 by the function of the OS 405. In the embodiment, although the external memory is used as a medium to record the printing program, any one of an FD drive, an HD drive, a CD-ROM, an IC memory card, and the like can be also used as an external memory. Further, it is also possible to construct such that the printing program is recorded solely in the ROM 3 or is recorded therein together with programs which operate on the OS or the other host computer and is constructed so as to form a part of the memory map and is directly executed by the CPU 1.

Effects of the Invention

As described above, according to the first aspect of the invention, there is provided a print control apparatus which can communicate with a plurality of printing apparatuses via a predetermined communication medium, comprising: first converting means for converting drawing information which is required from an application into a drawing object which does not depend on each printing apparatus; storing means for storing the drawing object converted by the first converting means; a plurality of second converting means for converting the drawing object stored in the storing means into print control information that is peculiar to the printing apparatus that is selected and for transferring the print control information to each corresponding printing apparatus; discriminating means for discriminating the occurrence of a print processing error by monitoring a print processing state for a time interval from the start of the converting process by any one of the second converting means until a printing process of any one of the printing apparatuses is finished; and control means for selecting any one of the second converting means corresponding to the set other printing apparatus when it is determined by the discriminating means that the print processing error has occurred in such one of the printing apparatuses. Therefore, the drawing object which does not depend on each printing apparatus is held until the printing process is successfully completed in the selected one of the printing apparatuses. When some error occurs during the printing process for the printing apparatus selected by the user, the set next alternate printing apparatus is selected. The peculiar print control information is converted from the stored drawing object and can be sequentially transferred to the selected printing apparatus. The selection burden of the candidates of the printing apparatuses of the user can be reduced. The print control information can be soon transferred to the printing apparatus of the next priority. The print environment such that the print processing time can be remarkably reduced and the printing process can be efficiently performed can be established.

According to the second aspect of the invention, in the print control apparatus, the print processing error includes a conversion processing error by any one of the second converting means, a transfer error of the print control information which is converted by any one of the second converting means, and an engine operation error of any selected one of the printing apparatuses. Therefore, the print processing error during a series of printing process is captured and the printing process can be dynamically switched from the selected printing apparatus to the printing process for the set other printing apparatus.

According to the third aspect of the invention, the print control apparatus further has: setting means for setting, every printing apparatus, the printing apparatus of a next priority to which the drawing object stored in the storing means should be transferred when the print processing error occurs; and memory means for storing a list of the printing apparatuses of a next priority which have been set by the setting means and to which the drawing object should be transferred, wherein the control means selects any one of the second converting means corresponding to another printing apparatus set in the list of the printing apparatuses of the next priority stored in the memory means. Therefore, the print control information which is converted from the drawing object stored for the desired printing apparatus can be sequentially transferred in accordance with the priorities which are desired by the user.

According to the fourth aspect of the invention, since the printing apparatus includes a local printer and network printers, the alternate printing apparatus candidates at the time of the occurrence of a fault can be freely selected from various print environments.

According to the fifth aspect of the invention, in the print control apparatus, the network printers include: a first network printer which is connected to the predetermined communication medium via a server; and a second network printer which is directly connected to the predetermined communication medium. Therefore, the alternate network printer candidates at the time of the occurrence of a fault can be freely selected from various network printer environments.

According to the sixth or eleventh aspect of the invention, there is provided a data processing method of a print control apparatus which can communicate with a plurality of printing apparatuses via a predetermined communication medium or there is also provided a memory medium in which a computer readable program for controlling a data processing apparatus which can communicate with a plurality of printing apparatuses via a predetermined communication medium has been stored. The above data processing method or the above computer readable program stored in the memory medium comprises: a first converting step of converting drawing information which is required from an application into a drawing object which does not depend on each printing apparatus; a storing step of storing the drawing object converted by the first converting step into a memory; a plurality of second converting steps of converting the drawing object stored in the memory by the storing step into print control information that is peculiar to the printing apparatus that is selected and transferring the print control information to each corresponding printing apparatus; a discriminating step of discriminating the occurrence of a print processing error by monitoring a print processing state for a time interval from the start of the converting process by any one of the second converting steps until a printing process of any one of the printing apparatuses is finished; and a selecting step of selecting any one of the second converting steps corresponding to the set other printing apparatus when it is determined by the discriminating step that the print processing error has occurred in such one of the printing apparatuses. Therefore, the drawing object which does not depend on each printing apparatus is held until the printing process is successfully completed in the selected one of the printing apparatuses, and when some error occurs during the printing process to the printing apparatus selected by the user, the set next alternate printing apparatus is selected, and the peculiar print control information is converted from the stored drawing object and can be sequentially transferred to the selected printing apparatus. The selection burden of the printing apparatus candidates of the user can be reduced. The print control information can be soon transferred to the printing apparatus of the next priority. The print environment in which the print processing time is remarkably reduced and the printing process can be efficiently performed can be established.

According to the seventh or twelfth aspect of the invention, in the data processing method or the computer readable program stored in the memory medium, the print processing error includes a conversion processing error by any one of the second converting steps, a transfer error of the print control information which is converted by any one of the second converting steps, and an engine operation error of any selected one of the printing apparatuses. Therefore, the print processing error during the series of printing processes is captured and the printing process can be dynamically switched from the selected printing apparatus to the set other printing apparatus.

According to the eighth or thirteenth aspect of the invention, the data processing method or the computer readable program stored in the memory medium further has: a setting step of setting, every printing apparatus, the printing apparatus of a next priority to which the drawing object stored in the memory should be transferred when the print processing error occurs; and a registering step of registering a list of the printing apparatuses of a next priority which have been set by the setting step and to which the drawing object should be transferred into the memory, wherein in the selecting step, any one of the second converting steps corresponding to another printing apparatus set in the list of the printing apparatuses of the next priority stored in the memory is selected. Therefore, the print control information which is converted from the drawing object stored can be sequentially transferred to the desired printing apparatus in accordance with the priority which is desired by the user.

According to the ninth or fourteenth aspect of the invention, since the printing apparatus includes a local printer and network printers, the alternate printing apparatus candidate at the time of the occurrence of a fault can be freely selected from various print environments.

According to the tenth or fifteenth aspect of the invention, in the data processing method or the computer readable program stored in the memory medium, the network printers include: a first network printer which is connected to the predetermined communication medium via a server; and a second network printer which is directly connected to the predetermined communication medium. Therefore, the alternate network printer candidate at the time of the occurrence of a fault can be freely selected from various network printer environments.

According to the sixteenth aspect of the invention, the print control apparatus further has second discriminating means for discriminating a compatibility between the printing apparatus of the next priority selected by the selecting means and a printing apparatus of a previous priority, wherein the control means transfers the converted print control information to the printing apparatus of the next priority when it is determined by the second discriminating means that there is the compatibility between the printing apparatus of the next priority and the printing apparatus of a previous priority. Therefore, when an error occurs during the printing process to the selected printing apparatus, if the printing apparatus which is selected as a printing apparatus of the next priority has the compatibility with the printing apparatus of the previous priority, the print control information which has already been converted can be directly transferred and the re-converting process is unnecessary. The print processing time in the printing apparatus of the next priority can be remarkably reduced.

According to the seventeenth or eighteenth aspect of the invention, the data processing method or the computer readable program stored in the memory medium has: a second discriminating step of discriminating a compatibility between the printing apparatus of the next priority selected by the selecting step and a printing apparatus of a previous priority; and a transferring step of transferring the converted print control information to the printing apparatus of the next priority when it is determined by the second discriminating step that there is the compatibility between the printing apparatus of the next priority and the printing apparatus of the previous priority. Therefore, when an error occurs during the printing process to the selected printing apparatus, if the printing apparatus which is selected as a printing apparatus of the next priority has the compatibility with the printing apparatus of the previous priority, the print control information which has already been converted can be directly transferred and the re-converting process is unnecessary. The print processing time in the printing apparatus of the next priority can be remarkably reduced.

Therefore, there is an effect such that the print processing environment in which the alternate printing process can be automatically performed by the printing apparatus of the next priority when a fault occurs during the printing process can be freely established, or the like.

According to the invention as described above, it is possible to provide a print control apparatus and its method, in which the application can be soon released and, further, the processes such that a fault during the execution of the print is avoided and the print can be certainly performed without troubling the user are realized.

Further, in a state where the application is released, the problem occurring due to the change of the printing apparatus on the output destination side can be notified to the user and is solved by the alternate means, thereby enabling a desired print output of the user to be executed.

What is claimed is:

1. A print control apparatus which can communicate with a plurality of printing apparatuses via a predetermined communication medium, comprising:
    first converting means for functioning as a common printer driver for receiving from a graphic engine drawing information generated by the graphic engine from output data generated by an arbitrary application and for converting the received drawing information into independent data which does not depend on each of the plurality of printing apparatuses, the converted independent data being stored in a spooler;
    despooling means for despooling the independent data stored in the spooler such that one of a plurality of printer drivers may generate print control information specific to a corresponding one of the plurality of printing apparatuses based on contents of the despooled independent data, and for retaining the independent data in the spooler even after despooling the independent data;
    discriminating means for discriminating an occurrence of a print processing error by monitoring a print processing state of the one printing apparatus which corresponds to the one printer driver;
    control means for selecting another one of the plurality of printer drivers corresponding to another one of the plurality of printing apparatuses when it is determined by said discriminating means that the print processing error has occurred in the one printing apparatus, and for controlling said despooling means to despool the independent data retained in the spooler so as to generate print control information by the other printer driver.

2. An apparatus according to claim 1, wherein the print processing error includes an engine operation error of the one printing apparatus.

3. An apparatus according to claim 1, further comprising:
    setting means for setting, for each of the plurality of printing apparatuses, the printing apparatus of a next priority to which the independent data stored in the spooler should be transferred when the print processing error occurs; and
    memory means for storing a list of the printing apparatuses of a next priority which have been set by said setting means and to which the independent data should be transferred,
    and wherein said control means selects the other printer driver corresponding to another printing apparatus set in the list of the printing apparatuses of the next priority stored in said memory means.

4. An apparatus according to claim 1, wherein said printing apparatus includes a local printer and network printers.

5. An apparatus according to claim 4, wherein said network printers include:
    a first network printer which is connected to said predetermined communication medium via a server; and
    a second network printer which is directly connected to said predetermined communication medium.

6. A data processing method of a print control apparatus which can communicate with a plurality of printing apparatuses via a predetermined communication medium, comprising:
    a first converting step of receiving from a graphic engine drawing information generated by the graphic engine from output data generated by an arbitrary application and converting the received drawing information into independent data which does not depend on each of the plurality of printing apparatuses, the converted independent data being stored in a spooler;
    despooling step of despooling the independent data stored in the spooler such that one of a plurality of printer drivers may generate print control information specific to a corresponding one of the plurality of printing apparatuses based on contents of the despooled independent data, wherein the independent data is retained in the spooler even after despooling the independent data;
    a discriminating step of discriminating an occurrence of a print processing error by monitoring a print processing state of the one printing apparatus which corresponds to the one printer driver; and
    a selecting step of selecting another one of the plurality of printer drivers corresponding to another one of the plurality of printing apparatuses when it is determined by said discriminating step that the print processing error has occurred in the one printing apparatus, and for controlling said despooling means to despool the independent data retained in the spooler so as to generate print control information by the other printer driver.

7. A method according to claim 6, wherein the print processing error includes an engine operation error of the one printing apparatus.

8. A method according to claim 6, further comprising:
    a setting step of setting, for each of the plurality of printing apparatuses, the printing apparatus of a next priority to which the independent data stored in the spooler should be transferred when the print processing error occurs; and
    a registering step of registering a list of the printing apparatuses of a next priority which have been set by said setting step and to which the independent data should be transferred,
    wherein in said selecting step, the other printer driver corresponding to another printing apparatus set in the list of the printing apparatuses of the next priority is selected.

9. A method according to claim 6, wherein said printing apparatus includes a local printer and network printers.

10. A method according to claim 9, wherein said network printers include:
    a first network printer which is connected to said predetermined communication medium via a server; and
    a second network printer which is directly connected to said predetermined communication medium.

11. A memory medium in which a computer readable program for controlling a data processing apparatus which can communicate with a plurality of printing apparatuses via a predetermined communication medium has been stored, wherein said program comprises:

a first converting step of receiving from a graphic engine drawing information generated by the graphic engine from output data generated by an arbitrary application and converting the received drawing information into independent data which does not depend on each of the plurality of printing apparatuses, the converted independent data being stored in a spooler;

despooling step of despooling the independent data stored in the spooler such that one of a plurality of printer drivers may generate print control information specific to a corresponding one of the plurality of printing apparatuses based on contents of the despooled independent data, wherein the independent data is retained in the spooler even after despooling the independent data;

a discriminating step of discriminating an occurrence of a print processing error by monitoring a print processing state of the one printing apparatus which corresponds to the one printer driver; and a selecting step of selecting another one of the plurality of printer drivers corresponding to another one of the plurality of printing apparatuses when it is determined by said discriminating step that the print processing error has occurred in the one printing apparatus, and for controlling said despooling step to despool the independent data retained in the spooler so as to generate print control information by the other printer driver.

12. A medium according to claim 11, wherein the print processing error includes an engine operation error of the one printing apparatus.

13. A medium according to claim 11, wherein said program further comprises:

a setting step of setting, for each of the plurality of printing apparatuses, the printing apparatus of a next priority to which the independent data stored in the spooler should be transferred when the print processing error occurs; and a registering step of registering a list of the printing apparatuses of a next priority which have been set by said setting step and to which the independent data should be transferred, wherein in said selecting step, the other printer driver corresponding to another printing apparatus set in the list of the printing apparatuses of the next priority is selected.

14. A medium according to claim 11, wherein said printing apparatus includes a local printer and network printers.

15. A medium according to claim 14, wherein said network printers include:

a first network printer which is connected to said predetermined communication medium via a server; and a second network printer which, is directly connected to said predetermined communication medium.

16. An apparatus according to claim 1, further comprising second discriminating means for discriminating a compatibility between the printing apparatus of the next priority selected by said selecting means and a printing apparatus of a previous priority, and wherein said control means transfers the converted print control information to the printing apparatus of the next priority when it is determined by said second discriminating means that there is the compatibility between the printing apparatus of the next priority and the printing apparatus of the previous priority.

17. A method according to claim 6, further comprising:

a second discriminating step of discriminating a compatibility between the printing apparatus of the next priority selected by said selecting step and a printing apparatus of a previous priority; and a transferring step of transferring the converted print control information to the printing apparatus of the next priority when it is determined by said second discriminating step that there is the compatibility between the printing apparatus of the next priority and the printing apparatus of the previous priority.

18. A medium according to claim 11, wherein said program further comprises:

a second discriminating step of discriminating a compatibility between the printing apparatus of the next priority selected by said selecting step and a printing apparatus of a previous priority; and a transferring step of transferring the converted print control information to the printing apparatus of the next priority when it is determined by said second discriminating step that there is the compatibility between the printing apparatus of the next priority and the printing apparatus of the previous priority.

19. An apparatus according to claim 1, further comprising:

means for, when the print in said printing apparatus is unsuccessfully completed and when the print cannot be performed even in the printing apparatus on an output destination side after the change, notifying the user of such a fact; and means for allowing the user to select whether the subsequent print is continued or not and, when the user selects the stop of the print, allowing the printing apparatus before the change to re-execute the print.

20. An apparatus according to claim 19, further comprising means for modifying print data which is sent to the printing apparatus on the basis of the data that does not depend on the printing apparatus and substituting a print instruction of the user in the case where the print instruction of the user cannot be executed because of a shortage of an ability of the printing apparatus after the change.

21. A method according to claim 6, further comprising the steps of:

when the print in said printing apparatus is unsuccessfully completed and when the print cannot be executed even in the printing apparatus on an output destination side after the change, notifying the user of such a fact; and allowing the user to select whether the subsequent print is continued or not and, when the user selects the stop of the print, allowing the printing apparatus before the print to re-execute the print.

22. A method according to claim 21, further comprising the step of modifying print data which is sent to the printing apparatus on the basis of the data that does not depend on the printing apparatus and substituting a print instruction of the user in the case where the print instruction of the user cannot be executed because of a shortage of an ability of the printing apparatus after the change.

23. A computer readable memory medium to store a computer program which enables an arbitrary printing apparatus to execute a print, wherein said program comprises the steps of:

converting device-independent data formed by a print control means into print data for printing by a first printing apparatus, wherein the device-independent data does not depend on a particular printing apparatus;

transmitting the print data to the first printing apparatus;

monitoring a state of the transmitted print data for print completion;

when the print is unsuccessfully completed, changing to a second printing apparatus on an output destination side on the basis of the device-independent data, converting the print data into print data specific to the second printing apparatus, and executing the print;

when a print instruction of the user, which the first printing apparatus is capable of executing, cannot be executed as it is by the second printing apparatus, notifying the user of such a fact; and allowing the user to select whether or not to print using the second printing apparatus, and when the user elects not to print using the second printing apparatus, allowing the first printing apparatus to re-execute the print.

24. A medium according to claim 23, wherein said program further comprises the step of, when the print instruction of the user cannot be executed because of a shortage or an ability of the second printing apparatus, modifying the device-independent print data that is sent to the printing apparatus and substituting the print instruction of the user.

25. An apparatus according to claim 1, wherein said independent data is a drawing object.

26. A method according to claim 6, wherein said independent data is a drawing object.

27. A medium according to claim 11, wherein said independent data is a drawing object.

28. A medium according to claim 23, wherein said device-independent data is a drawing object.

* * * * *